United States Patent
Craner

(10) Patent No.: US 8,863,168 B2
(45) Date of Patent: Oct. 14, 2014

(54) MEDIA CONTROL SYSTEM WITH VIEWER REWARDS

(75) Inventor: Michael L. Craner, Exton, PA (US)

(73) Assignee: Rovi Guides, Inc., Santa Clara, CA (US)

( * ) Notice: Subject to any disclaimer, the term of this patent is extended or adjusted under 35 U.S.C. 154(b) by 0 days.

(21) Appl. No.: 12/638,029

(22) Filed: Dec. 15, 2009

(65) Prior Publication Data

US 2010/0251281 A1 Sep. 30, 2010

Related U.S. Application Data

(63) Continuation of application No. 11/273,954, filed on Nov. 14, 2005, now abandoned.

(51) Int. Cl.
*H04N 7/16* (2011.01)
*H04N 21/441* (2011.01)
*H04N 21/475* (2011.01)
*H04N 7/173* (2011.01)
*H04N 21/482* (2011.01)

(52) U.S. Cl.
CPC ......... *H04N 7/17318* (2013.01); *H04N 21/441* (2013.01); *H04N 21/4756* (2013.01); *H04N 21/4758* (2013.01); *H04N 21/4751* (2013.01); *H04N 21/4825* (2013.01)
USPC .......................................................... 725/23

(58) Field of Classification Search
CPC .......... H04N 21/4424; H04N 21/4666; H04N 21/4756; H04N 21/2343; H04N 21/4825; H04N 21/4758; H04N 21/4751
USPC ......... 725/30, 34, 10, 23, 39, 58, 78, 93, 112, 725/134, 135, 31, 25; 709/226; 705/14.11
See application file for complete search history.

(56) References Cited

U.S. PATENT DOCUMENTS

| | | |
|---|---|---|
| 2,700,065 A | 1/1955 | Evans |
| 2,851,550 A | 9/1958 | Searcy |
| 2,856,474 A | 10/1958 | Norris |
| 3,879,332 A | 4/1975 | Leone |
| 4,012,583 A | 3/1977 | Kramer |
| 4,015,139 A | 3/1977 | Cleary et al. |
| 4,079,419 A | 3/1978 | Siegle et al. |
| 4,081,753 A | 3/1978 | Miller |

(Continued)

FOREIGN PATENT DOCUMENTS

| | | |
|---|---|---|
| AU | 21592/88 A | 3/1989 |
| FR | 2 678 091 | 12/1992 |

(Continued)

OTHER PUBLICATIONS

Common Sense Media Inc., CSM Family Friendly Reviews (from http://www.commonsensemedia.org/index.php).

(Continued)

*Primary Examiner* — Nasser Goodarzi
*Assistant Examiner* — An Nguyen
(74) *Attorney, Agent, or Firm* — Ropes & Gray LLP

(57) ABSTRACT

Systems and methods for viewing media content are provided. A set of media content with at least one feedback application is created. In response to the set creation and activation, media content may be tuned and launched automatically while other programming is restricted. User input associated with feedback applications may be received and media content rewards may be awarded.

35 Claims, 17 Drawing Sheets

(56) References Cited

U.S. PATENT DOCUMENTS

| | | | |
|---|---|---|---|
| 4,081,754 A | 3/1978 | Jackson | |
| 4,156,850 A | 5/1979 | Beyers, Jr. | |
| 4,162,513 A | 7/1979 | Beyers, Jr. et al. | |
| 4,163,254 A | 7/1979 | Block et al. | |
| 4,167,658 A | 9/1979 | Sherman | |
| 4,170,782 A | 10/1979 | Miller | |
| 4,225,884 A | 9/1980 | Block et al. | |
| 4,228,543 A | 10/1980 | Jackson | |
| 4,246,495 A | 1/1981 | Pressman | |
| 4,247,743 A | 1/1981 | Hinton et al. | |
| 4,288,809 A | 9/1981 | Yabe | |
| 4,305,101 A | 12/1981 | Yarbrough et al. | |
| 4,321,593 A | 3/1982 | Ho et al. | |
| 4,348,696 A | 9/1982 | Beier | |
| 4,355,415 A | 10/1982 | George et al. | |
| 4,390,901 A | 6/1983 | Keiser | |
| 4,425,579 A | 1/1984 | Merrell | |
| 4,429,385 A | 1/1984 | Cichelli et al. | |
| 4,482,789 A | 11/1984 | McVey | |
| 4,484,217 A | 11/1984 | Block et al. | |
| 4,484,220 A | 11/1984 | Beetner | |
| 4,488,179 A | 12/1984 | Kruger et al. | |
| 4,488,764 A | 12/1984 | Pfenning et al. | |
| 4,495,654 A | 1/1985 | Deiss | |
| 4,510,623 A | 4/1985 | Bonneau et al. | |
| 4,528,589 A | 7/1985 | Block et al. | |
| 4,536,791 A | 8/1985 | Campbell et al. | |
| 4,566,033 A | 1/1986 | Reidenouer | |
| 4,573,072 A | 2/1986 | Freeman | |
| 4,588,901 A | 5/1986 | Maclay et al. | |
| 4,598,288 A | 7/1986 | Yarbrough et al. | |
| 4,604,708 A | 8/1986 | Lewis | |
| 4,605,964 A | 8/1986 | Chard | |
| 4,605,973 A | 8/1986 | Von Kohorn | |
| 4,620,229 A | 10/1986 | Amano et al. | |
| 4,636,595 A | 1/1987 | Smock et al. | |
| 4,647,735 A | 3/1987 | Sicher | |
| 4,648,667 A | 3/1987 | Baumgart | |
| 4,685,131 A | 8/1987 | Horne | |
| 4,718,107 A | 1/1988 | Hayes | |
| 4,750,213 A | 6/1988 | Novak | |
| 4,768,229 A | 8/1988 | Benjamin et al. | |
| 4,807,023 A | 2/1989 | Bestler et al. | |
| 4,809,393 A | 3/1989 | Goodrich et al. | |
| 4,823,385 A | 4/1989 | Hegendorfer | |
| 4,855,611 A | 8/1989 | Isobe et al. | |
| 4,862,268 A | 8/1989 | Campbell et al. | |
| 4,885,775 A | 12/1989 | Lucas | |
| 4,888,796 A | 12/1989 | Olivo, Jr. | |
| 4,890,320 A | 12/1989 | Monslow et al. | |
| 4,890,321 A | 12/1989 | Seth-Smith et al. | |
| 4,903,031 A | 2/1990 | Yamada | |
| 4,930,158 A | 5/1990 | Vogel | |
| 4,930,160 A | 5/1990 | Vogel | |
| 4,994,908 A | 2/1991 | Kuban et al. | |
| 4,995,078 A | 2/1991 | Monslow et al. | |
| 5,001,554 A | 3/1991 | Johnson et al. | |
| 5,021,916 A | 6/1991 | Hubbard | |
| 5,033,085 A | 7/1991 | Rew | |
| 5,038,211 A | 8/1991 | Hallenbeck | |
| 5,045,947 A | 9/1991 | Beery | |
| 5,046,125 A | 9/1991 | Takizawa | |
| 5,051,837 A | 9/1991 | McJunkin | |
| 5,053,797 A | 10/1991 | Samuels et al. | |
| 5,053,884 A | 10/1991 | Kamijyo | |
| 5,056,139 A | 10/1991 | Littlefield | |
| 5,068,734 A | 11/1991 | Beery | |
| 5,075,771 A | 12/1991 | Hashimoto | |
| 5,168,353 A | 12/1992 | Walker et al. | |
| 5,172,111 A | 12/1992 | Olivo, Jr. | |
| 5,206,722 A | 4/1993 | Kwan | |
| 5,210,611 A | 5/1993 | Yee et al. | |
| 5,223,924 A | 6/1993 | Strubbe | |
| 5,231,310 A | 7/1993 | Oh | |
| 5,235,415 A | 8/1993 | Bonicel et al. | |
| 5,247,364 A | 9/1993 | Banker et al. | |
| 5,253,066 A | 10/1993 | Vogel | |
| 5,253,067 A | 10/1993 | Chaney et al. | |
| 5,260,778 A | 11/1993 | Kauffman et al. | |
| 5,291,301 A * | 3/1994 | Lee | 386/292 |
| 5,303,063 A | 4/1994 | Kim et al. | |
| 5,317,391 A | 5/1994 | Banker et al. | |
| 5,357,276 A | 10/1994 | Banker et al. | |
| 5,371,795 A | 12/1994 | Vogel | |
| 5,382,983 A | 1/1995 | Kwoh et al. | |
| 5,384,910 A | 1/1995 | Torres | |
| 5,396,546 A | 3/1995 | Remillard | |
| 5,425,101 A | 6/1995 | Woo et al. | |
| 5,446,488 A | 8/1995 | Vogel | |
| 5,465,113 A | 11/1995 | Gilboy | |
| 5,477,262 A | 12/1995 | Banker et al. | |
| 5,485,221 A | 1/1996 | Banker et al. | |
| 5,485,518 A | 1/1996 | Hunter et al. | |
| 5,548,345 A | 8/1996 | Brian et al. | |
| 5,550,575 A | 8/1996 | West et al. | |
| 5,557,724 A | 9/1996 | Sampat et al. | |
| 5,579,055 A | 11/1996 | Hamilton et al. | |
| 5,583,560 A | 12/1996 | Florin et al. | |
| 5,583,576 A | 12/1996 | Perlman et al. | |
| 5,585,866 A | 12/1996 | Miller et al. | |
| 5,589,892 A | 12/1996 | Knee et al. | |
| 5,592,551 A | 1/1997 | Lett et al. | |
| 5,594,509 A | 1/1997 | Florin et al. | |
| 5,621,456 A | 4/1997 | Florin et al. | |
| 5,629,733 A | 5/1997 | Youman et al. | |
| 5,664,046 A | 9/1997 | Abecassis | |
| 5,699,104 A | 12/1997 | Yoshinobu | |
| 5,716,273 A | 2/1998 | Yuen | |
| 5,743,743 A * | 4/1998 | Ho et al. | 434/236 |
| 5,751,335 A | 5/1998 | Shintani | |
| 5,758,258 A * | 5/1998 | Shoff et al. | 725/116 |
| 5,781,246 A | 7/1998 | Alten et al. | |
| 5,949,471 A | 9/1999 | Yuen et al. | |
| 5,969,748 A | 10/1999 | Casement et al. | |
| 6,072,520 A | 6/2000 | Yuen et al. | |
| 6,115,057 A | 9/2000 | Kwoh et al. | |
| 6,144,401 A | 11/2000 | Casement et al. | |
| 6,321,381 B1 | 11/2001 | Yuen et al. | |
| 6,463,454 B1 * | 10/2002 | Lumelsky et al. | 718/105 |
| 6,889,382 B1 | 5/2005 | Anderson | |
| 6,922,843 B1 | 7/2005 | Herrington et al. | |
| 7,086,075 B2 | 8/2006 | Swix et al. | |
| 7,224,260 B1 * | 5/2007 | Nowak | 340/286.02 |
| 7,577,995 B2 * | 8/2009 | Chebolu et al. | 726/26 |
| 2002/0016971 A1 | 2/2002 | Berezowski et al. | |
| 2002/0095673 A1 | 7/2002 | Leung et al. | |
| 2003/0115593 A1 | 6/2003 | Alten et al. | |
| 2003/0149980 A1 | 8/2003 | Hassell et al. | |
| 2003/0149988 A1 | 8/2003 | Ellis et al. | |
| 2003/0208763 A1 * | 11/2003 | McElhatten et al. | 725/58 |
| 2003/0237088 A1 | 12/2003 | Macrae et al. | |
| 2004/0019903 A1 | 1/2004 | Knudson et al. | |
| 2004/0103434 A1 | 5/2004 | Ellis | |
| 2004/0128681 A1 | 7/2004 | Hancock et al. | |
| 2004/0133909 A1 | 7/2004 | Ma | |
| 2004/0215964 A1 * | 10/2004 | Barlow et al. | 713/172 |
| 2005/0125822 A1 | 6/2005 | Casement et al. | |
| 2005/0147247 A1 | 7/2005 | Westberg et al. | |
| 2005/0188090 A1 * | 8/2005 | Washburn | 709/226 |
| 2006/0225106 A1 | 10/2006 | Bedingfield | |
| 2009/0292598 A1 * | 11/2009 | Dooms et al. | 705/14.11 |

FOREIGN PATENT DOCUMENTS

| | | |
|---|---|---|
| GB | 2 209 417 | 5/1989 |
| GB | 2 210 526 | 6/1989 |
| GB | 2 215 928 | 9/1989 |
| WO | WO-86/01962 A1 | 3/1986 |
| WO | WO-89/12370 A1 | 12/1989 |
| WO | WO-90/15507 A1 | 12/1990 |
| WO | WO-93/11638 A1 | 6/1993 |

(56) References Cited

FOREIGN PATENT DOCUMENTS

| WO | WO-93/11639 A1 | 6/1993 |
|---|---|---|
| WO | WO-93/11640 A1 | 6/1993 |

OTHER PUBLICATIONS

"Addressable Converters: A New Development at Cable Data," Via Cable, vol. 1, No. 12, Dec. 1981, Cable Data, Sacramento, California.

"A New Approach to Addressability," CableData product brochure, Cable Data, Sacramento, California, undated.

Brugliera, Vito, "Digital On-Screen Display—A New Technology for the Consumer Interface," Symposium Record Cable Sessions of the 18th International Television Symposium & Technical Exhibition, Jun. 1993, pp. 571-586.

CableComputer User's Guide, bearing a date of Dec. 1985 (Plaintiff's Exhibit 289).

CableData, Roseville Consumer Presentation, Mar. 1986.

Committee on Commerce, "Communications Act of 1995," XP-002100790 Jul. 1995, pp. 1-4.

Daniel F. Walsh Jr., Timing Considerations in RF Two Way Data Collection and Polling, Jerrold-Applies Media Lab, 1989 NCTA Technical Papers, pp. 47-56, 1989.

Daniel H. Smart, Innovative Aspects of a Switched Star Cabled Television Distribution System, British Cable Services Limited, 1987 NCTA Technical Papers, pp. 26-35, 1987.

Federal Communications Commission, In the Telecommunications Act of 1996, Public Law 104-104, effective Feb. 8, 1996, in Section 551, "Parental Choice in Television Programming," XP-002100791.

Gary Libman, Times Staff Writer Chaining the Channels, A New Generation of Television Blocking Systems Allows More Options for Parent, Seeking to Control Kids' Viewing, Los Angeles Times, Aug. 9, 1993.

Gregory F. Vaeth, John Feras, Enertec, Inc., The Addressable Controller of the Future, *General Instruments/Jerrold Communication*, 1990 NCTA Technical Papers, pp. 274-279, 1990.

Jerrold Communications Publication, "Cable Television Equipment," dated 1992 and 1993, pp. 8-2.1 to 8-6 and 8-14.1 to 8-14.3.

M/A-COM, Inc., "Videocipher II Satellite Descrambler Owner's Manual," dated prior to Feb. 1986.

Michael Dufresne, "New Services: An Integrated Cable Network's Approach, Videotron Communication LTEE," Technical Papers of NCTA 31st Annual Convention & Exposition, pp. 156-160 (1982).

Richard G. Merrell, Mack S. Daily, An Auto-Dialer Approach to Pay-Per-View Purchasing, Zenith Electronics Corporation, Glenview, Illinois, 1989 NCTA Technical Papers, pp. 34-38, 1989.

Roseville City Council Presentation, bearing a date of Mar. 13, 1985 (Defendant's Exhibit 26).

StarSight Telecast Inc. User's Guide, pp. 1-20 (1994).

T. Rzeszewski et al., "A Microcomputer Controlled Frequency Synthesizer for TV." Reprinted from *IEEE Trans. Consum. Electron*, vol. CE-24, pp. 145-153 (1978).

Videocipher Owner's Manual, M/A-Com., Publication No. 4096-048; Model No. VC-2000E or VC-2000E/B, undated.

"Weststar and Videotoken Network Present the CableComputer" (Plaintiff's Exhibit 334).

Non-Final Office Action dated Jun. 16, 2009 in U.S. Appl. No. 11/273,954 (now abandoned).

* cited by examiner

Comprehension Quiz: The Presidents Series

Question 5: Construction of the White House was started in October of 1792 and completed in 1800. Who was the first President to live in the White House?

Answers:

A. George Washington

B. Thomas Jefferson

C. Jon Adams

D. James Madison

NEXT

CANCEL

FIG. 10

MEDIA CONTROL SYSTEM WITH VIEWER REWARDS

CROSS-REFERENCE TO RELATED APPLICATIONS

This application is a continuation of U.S. patent application Ser. No. 11/273,954 filed on Nov. 14, 2005, all of which is hereby incorporated by reference herein in its entirety.

BACKGROUND OF THE INVENTION

This invention relates generally to television systems and, more particularly, to media controls for television systems that reward users for watching specified media content.

Various approaches have been used over the years to facilitate learning in children and adolescents. Some of these approaches to learning involve the use of educational multimedia programming. For example, various smart, electronic books and portable electronic tutors have been developed to integrate sound and video into the learning process. These electronic books and tutor devices may present advanced educational topics, such as world geography, foreign languages, and higher arithmetic, to children in a more fun and user-friendly way.

The aforementioned teaching techniques suffer from several disadvantages. For example, children may still become bored or disinterested in multimedia teaching methods. This boredom may stem from a lack of motivation to learn the material being presented. It may also be due to a lack of stimulating and interesting content. Children may also "zone out" or not pay attention to educational material being presented to them. Research has shown that boredom may be reduced while heightening attention and motivation levels by incorporating positive reinforcement and feedback into the learning process in a rich media environment.

Accordingly, it is desirable to provide a parental control system which improves the control parents have on the content that their children are watching, and/or, more generally, a content control system associated with a multimedia entertainment system (e.g., audio, video, or gaming system) that has increased flexibility in what content is accessible via the multimedia entertainment system.

SUMMARY OF THE INVENTION

These and other objects of the invention are accomplished in accordance with the principles of the present invention by providing an interactive content control application (ICCA) accessible from the home using standard user equipment. The interactive content control application presents selected media content during specific supervisor-defined periods of time. The selected media content includes at least one feedback application, which requires some user input or interaction. Based on the result of the feedback application, the interactive content control application determines what content, if any, to present next to the user.

Upon proper authentication, supervisors enter a privileged mode and customize the interactive content control application to start and stop at predetermined times. Supervisors in privileged mode also select media content and interactive feedback applications to include in one or more user media lists. In some embodiments, the supervisor also selects the order of the media content display. The interactive content control application uses these media lists to determine what content is presented and at what time that content is presented on the user equipment.

Once a media list is created and scheduled, the interactive content control application executes the list for viewing at a supervisor-specified time. Media content may be automatically tuned and launched for viewing in the order established by the media list. Interactive feedback applications, which require some user input, may also be presented to the user at the conclusion of certain user-selected media programs. The interactive content control application processes the user's input in response to the feedback applications and rewards the user with additional media content or media privileges if the feedback application is completed successfully. In some embodiments, the interactive content control application reports the completion of a feedback application to third-parties and may receive media content control commands remotely from third-parties.

BRIEF DESCRIPTION OF THE DRAWINGS

The above and other features of the present invention, its nature and various advantages will be more apparent upon consideration of the following detailed description, taken in conjunction with the accompanying drawings, and in which:

FIG. 10 shows an illustrative feedback application display screen in accordance with one embodiment of the present invention;

DETAILED DESCRIPTION

Figure 1:
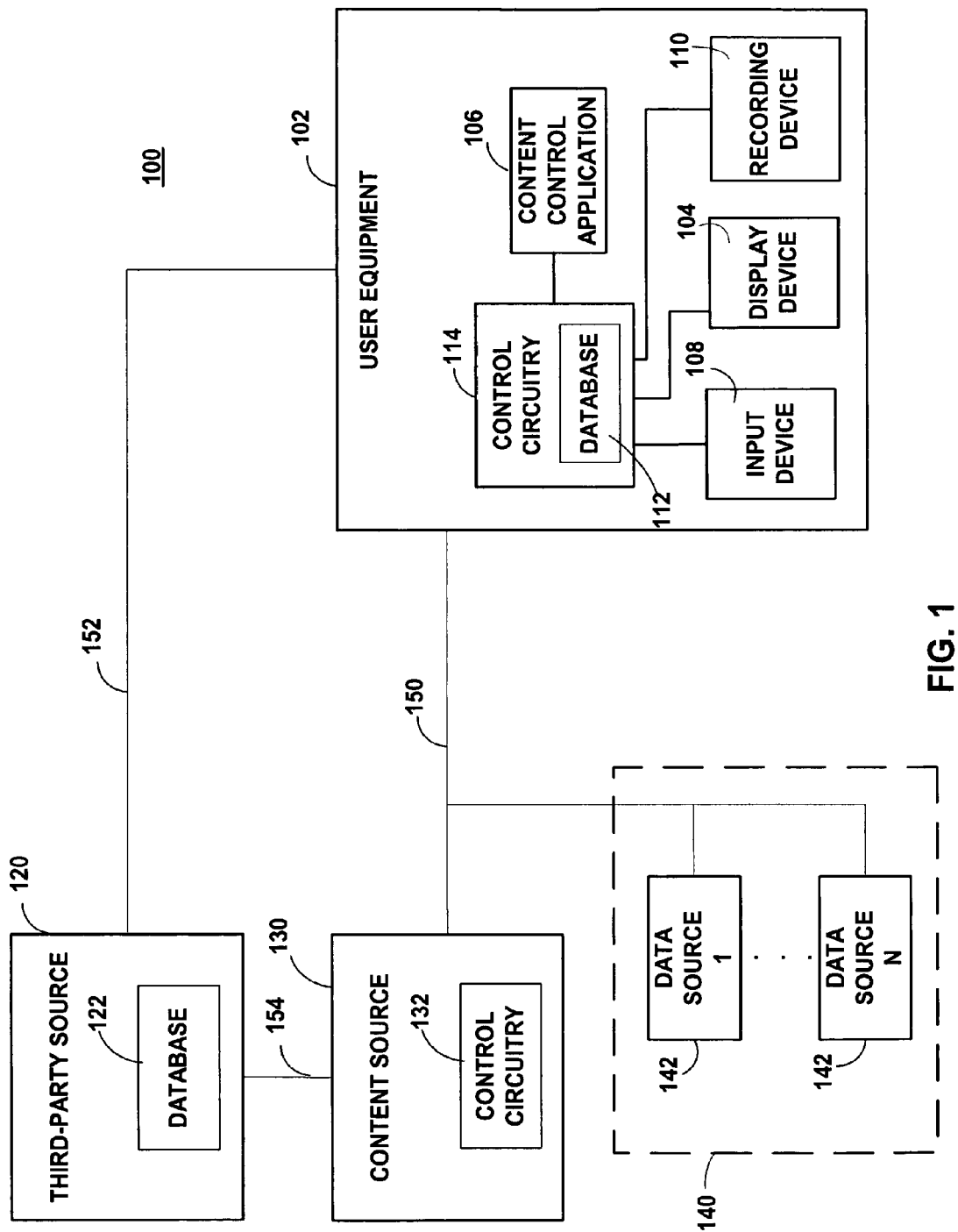
FIG. 1 is a diagram of an illustrative interactive television system in accordance with one embodiment of the present invention.

FIG. 1 shows illustrative interactive television system 100 in accordance with one embodiment of the invention. User equipment 102 receives content in the form of signals from content source 130 and/or third-party source 120 over communications paths 150 and 152. Any suitable number of users may have user equipment, such as user equipment 102, coupled to content source 130, data sources 140, and third-party source 120. For the clarity of the figure, however, the user equipment of only a single user is shown. In addition, although in practice there may be numerous instances of content sources and third-party sources, for clarity only content source 130 and third-party source 120 are shown in FIG. 1.

Content source 130 may be any suitable content source such as, for example, a cable system headend, satellite television distribution facility, television broadcast facility, on-demand server (e.g., video-on-demand ("VOD") server), Internet or network media/web server, or any other suitable facility or system for originating or distributing passive or interactive media content to user equipment 102. Media content that may be provided by content source 130 to user equipment 102 includes broadcast programs, broadcast series, VOD programs, music, news, interactive applications (e.g., interactive games, educational programs, and interactive quizzes), Internet resources and web services (e.g., websites, newsgroups, and chat rooms), and any other media content capable of being displayed by, presented to, recorded, or interacted with, using user equipment 102.

Third-party source 120 may be any suitable data source configured to provide program ratings information and interactive feedback applications to content source 130 or directly to user equipment 120 via communications paths 154 and 152, respectively. Third-party source 120 may comprise any third-party application provider, data manager, content manager, content aggregator, or intermediate content provider. Third-party source 120 may also be contracted to provide enhanced reporting services on behalf of user equipment 102. For example, third-party source 120 may be connected to the Internet or other communications network via a network interface (not shown) for communication with external users and systems. Third-party source 120 may include database 122 for access to program listings, interactive feedback application lists, application data, etc. For example, database 122 may hold interactive feedback applications on behalf of user equipment 102. Database 122 may also hold listings and pointers to this content for access by user equipment 102 on-demand. Although database 122 is shown internal to third-party source 120, database 122 may be any storage device accessible by third-party source 120 and may be external to third-party source 120.

Database 122 may also store the interactive content control application itself. Upon receiving a request from user equipment 102, third-party source 120 may transmit the interactive content control application directly to user equipment 102 via communications path 152 (or third-party source 120 may transmit the interactive content control application to content source 130 for transmission to user equipment 120, if desired). In one embodiment, either or both of the interactive content control application and the interactive feedback application are OpenCable Applications Platform ("OCAP") applications downloaded by middleware to user equipment 102. User equipment 102 (or a proxy acting on behalf of the user equipment) may periodically query third-party source 120 for application updates, various third-party media content, interactive feedback applications, program ratings information, or any other parental control or media content information.

Content source 130 and third-party source 120 may be configured to transmit signals to user equipment 102 over any suitable communications paths 150 and 152 including, for example, a satellite path, a fiber-optic path, a cable path, or any other suitable wired or wireless path. The signals may be transmitted as a broadcast, multicast, unicast, or any other suitable transmission stream. Content source 130 may also include control circuitry 132 for performing operations on the signals transmitted by the content source such as, for example, generating new signals or communicating with user equipment 102 to provide on-demand content.

User equipment 102 may receive interactive television application data from one or more instances of data sources 140, content source 130, and third-party source 120. These sources may also hold interactive feedback applications for access by user equipment 102 on-demand. Data sources 140 may provide data for a particular type of content or for a particular application running on user equipment 102. For example, one data source 142 may provide data for an interactive television program guide application and another data source may provide data and content for interactive content control application 106. In some embodiments, data sources 140 may provide data to the applications running on user equipment 102 using a client-server model. There may be one server per data source, one server for all sources, or, in some embodiments, a single server may communicate as a proxy between user equipment 102 and various data sources 140.

Content source 130, third-party source 120, and data sources 140 are shown in FIG. 1 as separate elements. In practice, their functionality may be combined into a single mechanism and provided from a single system at a single facility, or their functionality may be provided by multiple systems at multiple facilities. For example, content source 130 and data source 142 may be combined to provide broadcast television content and associated broadcast television data, including ratings information, program data, or other suitable information.

User equipment 102 may include any equipment suitable for providing an interactive media experience. For example, user equipment 102 may include computer equipment, such as a personal computer with a television card (PCTV). User equipment 102 may also include television equipment such as a television and set-top box, a recording device, a video player, a user input device (e.g., remote control, a keyboard, a mouse, a touch pad, a touch screen, and/or a voice recognition/verification module) or any other device suitable for providing a complete, interactive television experience. For example, user equipment 102 may include a DCT 2000, 2500, 5100, 6208 or 6412 set-top box provided by Motorola, Inc.

In the example of FIG. 1, user equipment 102 includes at least control circuitry 114, display device 104, interactive content control application 106, recording device 110, and user input device 108, all of which may be implemented as separate devices or as a single, integrated device. In addition to interactive content control application 106, other interactive television applications, such as an interactive television program guide, may be implemented on user equipment 102. For example, these interactive television applications may direct a tuner in control circuitry 114 to display, on display device 104, the content transmitted by content source 130 or third-party source 120 over communications paths 150 and 152 and to provide interactive television application features.

Display device 104 may be any suitable device capable of presenting human-perceivable media, such as, for example, a television monitor, computer monitor, LCD display, video projection device, holographic projector, virtual reality simulator, etc. Display device 104 may also be configured to provide audio and other sensory output.

Control circuitry 114 is adapted to receive user input from input device 108, execute the instructions of interactive content control application 106, execute any other interactive television applications, and direct display device 104 to display media content and interactive application display screens and overlays. Control circuitry 114 may include one or more tuners (e.g., analog or digital tuners), encoders and decoders (e.g., MPEG encoders and decoders), processors (e.g., Motorola 68000 family processors), memory (i.e., RAM and hard disks), communications circuitry (e.g., cable modem and ATSC 256QAM receiver circuitry), input/output circuitry (e.g., graphics circuitry), connections to the various devices of user equipment 102 (e.g., content control application 106 and recording device 110), and any other suitable components for providing analog or digital television programming, content control, and interactive television features. In one embodiment, control circuitry 114 may be included as part of one of the devices of user equipment 102 such as, for example, part of display 104 or any other device (e.g., a set-top box, television, and/or video player).

Control circuitry 114 may include memory 112 for storing or caching data from data sources 140, content source 130, or third-party source 120. This data may include data for use by interactive content control application 106 (e.g., media content information, user profiles, interactive feedback application data, user media lists, ratings information, equipment settings, or other suitable information). Control circuitry 114 may also be configured to execute the instructions of interactive content control application 106 from memory 112 (e.g., from RAM, ROM, hybrid types of memory, hard disks, and/or optical drives).

Although, in the illustrated embodiment of FIG. 1, interactive content control application 106 is internal to user equipment 102, content control application 106 may be implemented externally or partially implemented externally to user equipment 102. For example, interactive content control application 106 may be implemented at third-party source 120 or content source 130 and may run using a client-server or distributed architecture where some of the application is implemented locally on user equipment 102 in the form of a client process and some of the application is implemented at a remote location in the form of a server process. Content control application 106 may also be implemented on any suitable server, computer equipment, or set-top box accessible by user equipment 102. In some embodiments, interactive content control application 106 is integrated with another interactive television application or is implemented as a standalone application, subprocess, or class (e.g., in an OCAP environment). In one embodiment, content control application 106 is completely integrated within an interactive television program guide application running on user equipment 102. In this embodiment, the management and administrative functionality of interactive content control application 106 may be invoked directly by the interactive television program guide or the underlying operating system after some user input from input device 108.

In at least some embodiments, interactive content control application 106 is implemented in software. However, an implementation of software and/or hardware may be used in other embodiments. These arrangements are merely illustrative. Other suitable techniques for implementing interactive content control application 106 may be used if desired.

Interactive content control application 106 may store and manage media lists of content created by the user, lists obtained from third-party source 120, and any other media content control information in memory 112. Interactive content control application 106 may also filter, block, augment, or otherwise modify signals from control circuitry 114 to effect various content control conditions on user equipment 102.

Media lists are ordered lists of media content accessible by user equipment 102. These lists are scheduled to be played back or presented on display device 104 at a supervisor-specified time. A media list may specify specific media content (e.g., a certain broadcast program, VOD program, or recorded program) to be presented on display device 104 at a supervisor-selected time, as described in concurrently filed patent application Ser. No. 11/274,851, which is hereby incorporated by reference herein it its entirety. Alternatively or additionally, media lists may specify sets, or palettes, of permitted media content to be presented on display device 104 during a block of supervisor-selected time, as described in concurrently filed patent application Ser. No. 11/273,921, which is hereby incorporated by reference herein it its entirety. If a palette of permitted content is added to a media list, users at user equipment 102 may select any content included in the palette for presentation on display device 104 during the supervisor-specified time. For example, a media list may specify that a set of Internet websites may be presented on display device 104 from 5:00 to 5:30. During this time, the user may freely choose to be presented with any website within the set during the supervisor-specified presentation time.

In some embodiments, the media list presentation time is pre-programmed by the supervisor. In other embodiments, the start of the media list presentation may be a dynamic function based on some internal or external user equipment event. For example, a signal might be transmitted to the user equipment by content source 130 or third-party source 120 (FIG. 1). In some embodiments, this signal may immediately trigger an internal user equipment event that starts the presentation of a media list. In other embodiments this signal is used in conjunction with an internal timer in the user equipment to start the media list presentation at some pre-determined amount of time after the signal is received (e.g., 30 minutes, one hour, or one day after the signal is received). In other embodiments, an external user equipment event may trigger the start of a media list. For example, a user or supervisor may power on the user equipment or attempt to use an attached input device. This external event may automatically trigger the media list to start immediately or after some pre-determined amount of time.

In some embodiments, the content control application may lock or block access to media content on the user equipment before and/or after a media list presentation. Thus, an authorized supervisor may restrict media access for a supervisor-specified number of hours (or any other period of time) outside the media list runtime. In this way, for example, children or other users finishing a late evening media list are unable to access additional content after the media list has terminated (and after the children's bedtime). Authorized supervisors may customize the length of time the user equipment should be locked outside the media list runtime. In at least one embodiment, access to media content on the user equipment is locked at all times outside the media list runtime.

Media lists also contain at least one interactive feedback application. Interactive feedback applications may include any application or media content that permits user input and returns a completion value to the interactive content control application. Some examples of interactive feedback applications may include interactive websites, interactive games and quizzes, and/or interactive educational presentations and courses. In some embodiments, the interactive feedback application is associated with a content segment and a feedback segment. In these embodiments, a user is first presented with the content segment, and then the user attempts to complete the feedback segment based on information from the content segment. For example, a National Geographic educational special on Africa may be presented to the user before an interactive geography quiz on Africa. In other embodiments, there is no clear distinction between the content segment and feedback segment. In these embodiments, content is presented along with the feedback segment, as is typically done with interactive websites and games.

Content control application 106 processes the user input received in response to the feedback segment and determines if the user input successfully completes the feedback application. Successful completion of the feedback application may be determined in several ways, depending on the type of feedback application. For example, the content control application may require a certain, supervisor-defined percentage score on a comprehension quiz to signify successful completion of the feedback application. As another example, the mere completion of all entries or questions may signify successful completion of the feedback application. Authorized supervisors may establish the successful completion criteria in advance, or the interactive content control application may automatically select the successful completion criteria. In other embodiments, the interactive content control application receives a default completion criteria definition from a content or data source at the time the feedback application is accessed or presented on the user equipment. This default completion criteria may be used in the absence of a supervisor-specified completion criteria.

In some embodiments, the feedback segment of the feedback application is timed. In these embodiments, the feedback segment may resemble a structured exam environment. If user input is not received for some or all of the entries or questions by the conclusion of the allotted feedback segment time window, these unanswered entries may be marked as incorrect. A clock or timer may be displayed within the feedback application to remind the user of the remaining time. The clock or timer may optionally be hidden by the user by selecting an appropriate function or key on input device 108, if desired. Alternatively or additionally, application data from third-party source 120, content source 130, or data sources 140 may indicate which questions and/or feedback content that has already been presented to a user at user equipment 102 in a particular feedback application. In these embodiments, interactive content control application 106 may request and present new feedback questions and content on subsequent application presentations.

Regardless of the completion criteria or type of feedback application, at the conclusion of the feedback segment of the application some completion return value is submitted to the interactive content control application. From this return value, the interactive content control application determines what is presented next on the user equipment. In some embodiments, if the interactive content control application determines that the feedback application has been completed successfully, the media list progresses to the next scheduled element in the list (i.e., reward content). In other embodiments, upon successful completion of a feedback segment, the user is additionally or alternatively credited with some media privilege (e.g., one hour of DVD time, 30 minutes of PPV time, and/or 100 MB of recording space on recording device 110). If the interactive content control application determines that the feedback segment has not been completed successfully, the interactive content control application may take several actions. These actions may include allowing the user to retake the feedback segment without re-presenting the associated content segment, allowing the user to retake the feedback segment only after re-presenting the content segment, and/or restricting all or some media content access on user equipment 102. For example, in one embodiment, if the interactive content control application determines that the feedback segment was not completed successfully, access to further content is restricted until an authorized supervisor resets the system.

During playback of a media list, a user may not terminate the playback of the list or be presented with media content not included in the list without proper authorization. Media list content may include any media content capable of being displayed by, presented to, recorded, or interacted with, using user equipment 102. For example, interactive content control application 106 may present a media list including a video recorded on recording device 110, an Internet website, and a VOD program on display device 104 during a supervisor-specified time period.

Interactive content control application 106 automatically executes a media list at the supervisor-specified start time. Media content selections included in active media lists may be received and presented automatically, one selection at a time. Additionally, all or part of user media lists may be automatically prerecorded by interactive content control application 106 to recording device 110. Recording device 110 may be any suitable storage or memory mechanism and may be integrated with a personal video recorder (PVR), digital video recorder (DVR), video cassette recorder (VCR), DVD-recorder, gaming system, or any other suitable media device. All or part of recorded media lists may then be scheduled for automatic launch and display at a supervisor-specified time.

Figure 2:
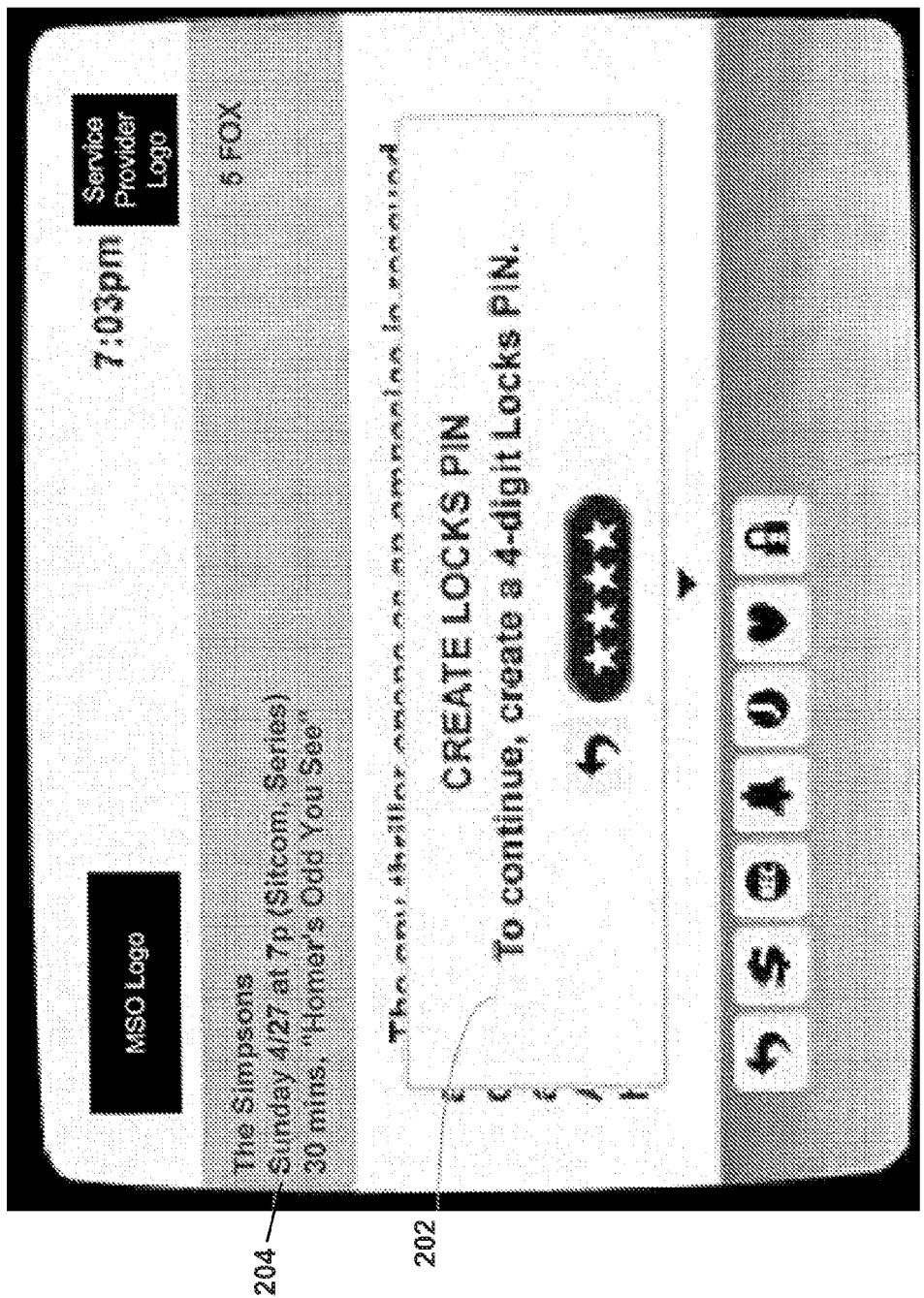
FIG. 2 shows an illustrative display screen showing an administrative parental control access code creation overlay in accordance with one embodiment of the present invention.

FIG. 2 shows illustrative display screen 200 prompting the supervisor to create an administrative parental control access code, such as a personal identification number ("PIN"), for accessing the interactive content control application in privileged mode in accordance with one embodiment of the invention. When accessing the interactive content control application for the first time or requesting any content control functions when no parental control access code is currently set, an administrative parental control access code should be created. This parental control access code will be required for all subsequent content control access requests. In the depicted embodiment, the parental control access code is comprised of four numeric characters; however, any number of numeric or alphanumeric characters may be used as an administrative parental control access code. Users may input data into create parental control access code overlay 202 using any available input device (e.g., remote control, keyboard, or mouse) or via a recognition and verification module (e.g., for voice, fingerprint, or iris). For example, as is understood in the art, a voice recognition module utilizes an attached microphone to translate common phonemes into data characters and commands. The voice verification module may compare the inputted phonemes to voiceprints already stored on user equipment 102. These stored voiceprints may have been established in advance via a voice training process. If an acceptable voiceprint match is found, access to the interactive content control application's privileged menu may be granted without the use of a manual parental control access code entry. A user may also navigate through the menu overlays, input data, and control the interactive television application via voice if desired.

As depicted in FIG. 2, create parental control access code overlay 202 may be displayed on top of another interactive television application. In some embodiments, create parental control access code overlay 202 may be integrated with an interactive television program guide parental control access code overlay (e.g., the VOD ordering parental control access code overlay or the parental control parental control access code overlay used with an interactive television program guide). In this way, all parental control access code entry and creation overlays may be identical and seamlessly integrated with an existing parental control access code overlay already resident on user equipment 102. In other embodiments, the create parental control access code overlay may be displayed directly by the interactive content control application on top of content being viewed. In the example of FIG. 2, the user has attempted to access a parental control feature from within a program information display for program 204 by selecting icon 206. Because no parental control access code is established for the user, the interactive content control application provides create parental control access code overlay 202.

Supervisors may access the content control application and be presented with create parental control access code overlay 202 in a number of ways. For example, in some embodiments, to access the interactive content control application the supervisor may: 1) press a special input key or command (or a series of keys or commands) on input device 108; 2) select an on-screen icon (such as icon 206); 3) be automatically linked to the interactive content control application from another interactive application; or 4) speak a pre-determined word or voice command (such as "media rewards").

Figure 3:
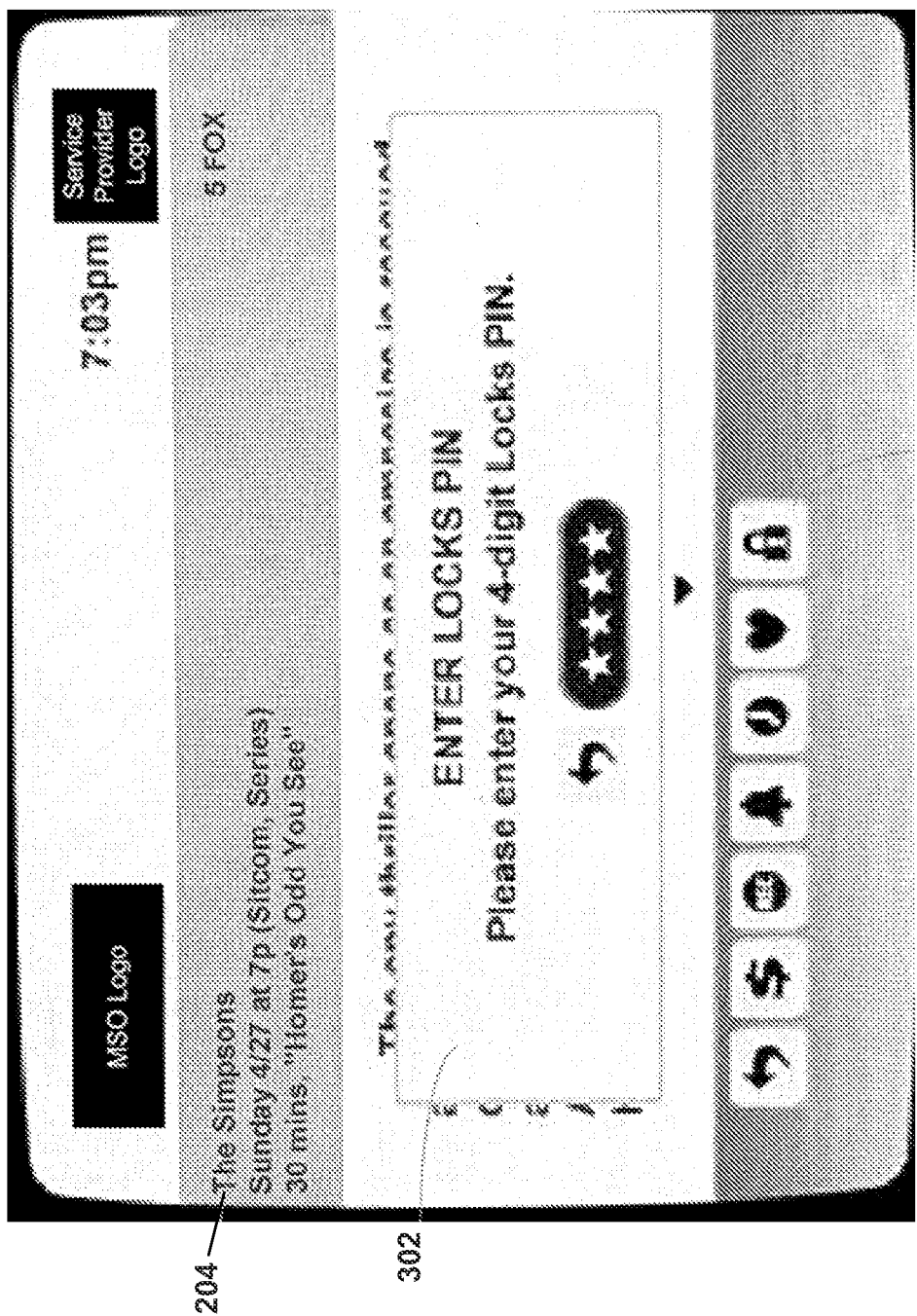
FIG. 3 shows an illustrative display screen showing an administrative parental control access code prompt overlay in accordance with one embodiment of the present invention.

FIG. 3 shows illustrative display screen 300 prompting the supervisor to input the administrative parental control access code in accordance with one embodiment of the invention. After the initial parental control access code creation process, subsequent attempts to access the interactive content control application in privileged mode require valid input into parental control access code entry overlay 302. This prevents unauthorized users (e.g., children) from accessing the content control application and altering the media list settings. Parental control access code entry overlay 302 may be presented to the user before all content control functions, including media list creation, management, and administration. In one embodiment, a single administrative parental control access code is used to access all functions of the interactive content control application; however, users and user groups may be created with varying levels of access to interactive content control application 106. For example, some supervisors may view and edit all media lists stored on the system, while other supervisors may only have access to view lists that they have created. Each supervisor may have a personal, unique parental control access code. Content control application 106 (or control circuitry 110 or a network authentication node) may validate each parental control access code entry and grant the appropriate permissions level to each supervisor.

Parental control access code entry overlay 302 may be presented at other times as well. Once a media list is launched, a user at user equipment 102 enters restricted mode. In restricted mode, content is presented to the user in the order established by the running media list. In some embodiments, if a user attempts to quit or terminate a running media list before the media list stop time or access content not included in a running media list, parental control access code entry overlay 302 is displayed to the user for authorization. Active, running media lists may be terminated only if a valid administrative parental control access code is accepted by the interactive content control application. This prevents children and other unauthorized users from quitting a running media list and accessing unapproved content before the media list completion time. In addition, certain functions of input device 108 may be restricted while media lists are running, as appropriate. For example, a user may not be allowed to access VOD programs directly or input numeric channel entries while a media list is being presented. Attempting to tune to an unauthorized channel via input device 108 may also cause parental control access code entry overlay 302 to be displayed. In this case, a timeout on the parental control access code entry overlay may be implemented such that the user can continue watching the active media list unobstructed by the parental control access code entry overlay.

Figure 4:
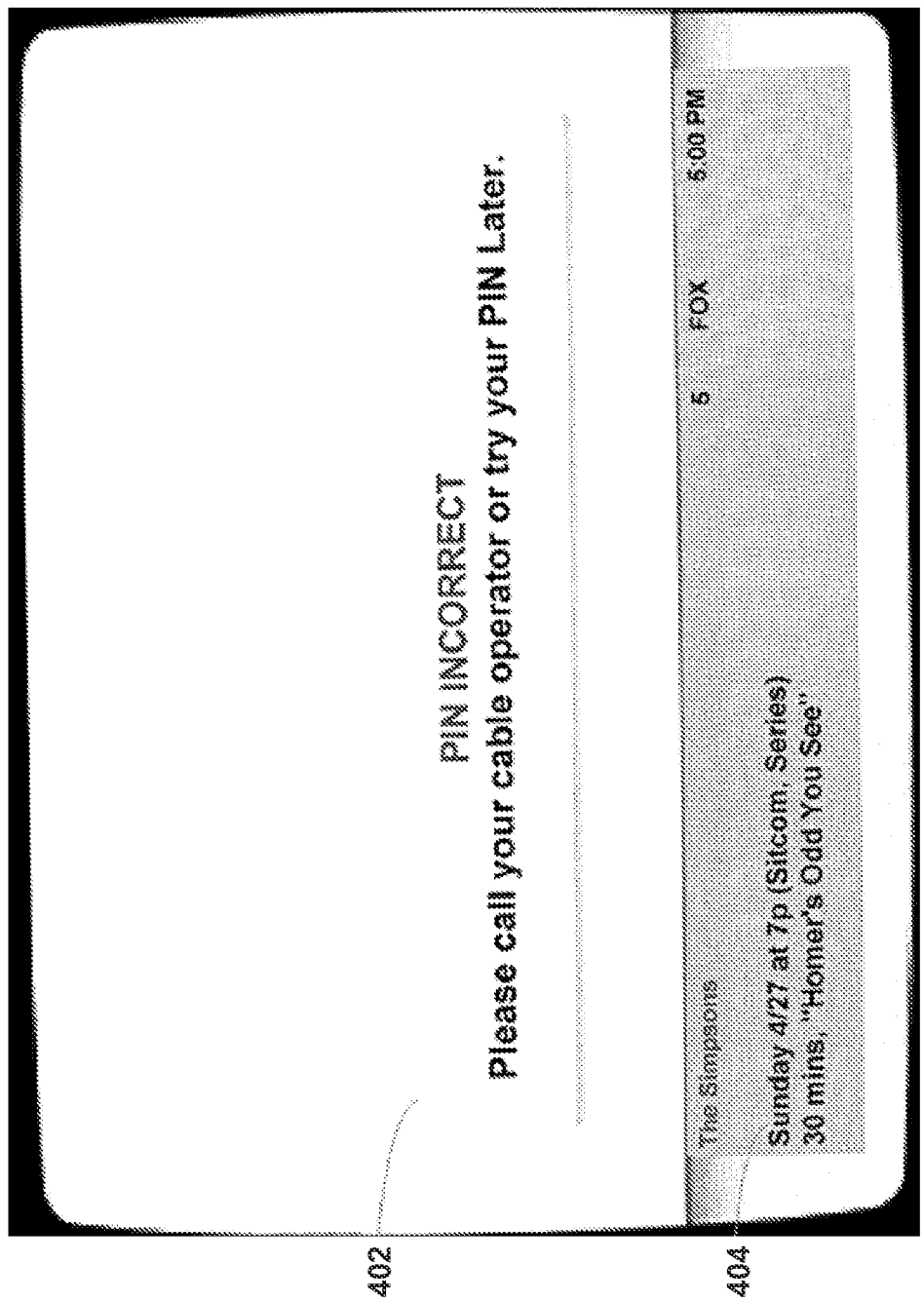
FIG. 4 shows an illustrative display screen showing an incorrect parental control access code entry overlay in accordance with one embodiment of the present invention.

FIG. 4 shows illustrative display screen 400 with incorrect parental control access code overlay 402 showing that the parental control access code entry was incorrect, invalid, or temporarily locked in accordance with one embodiment of the invention. Incorrect parental control access code overlay 402 may be presented after an unsuccessful attempt to access interactive content control application 106 in privileged mode or an unsuccessful attempt to terminate a running media list. The interactive content control application may also lock a parental control access code after a certain number of unsuccessful entry attempts. For example, in one embodiment the user is given 5 chances to input a valid parental control access code within a 30-minute time window before the parental control access code will be locked. Until the 30-minute time window has passed, access to the interactive content control system may be blocked for all users. Display screen 400 may optionally include listing 404. This listing could correspond to the unauthorized program that the user is attempting to access. In one or more embodiments, the interactive content control application includes a timeout for the incorrect parental control access code overlay, thus allowing the user to continue viewing the content in the active media list unobstructed. For example, it is anticipated that children may attempt to defeat the restrictions of the system at least once. The timeout feature would allow these children to continue to watch the media list after such attempts.

Figure 5:
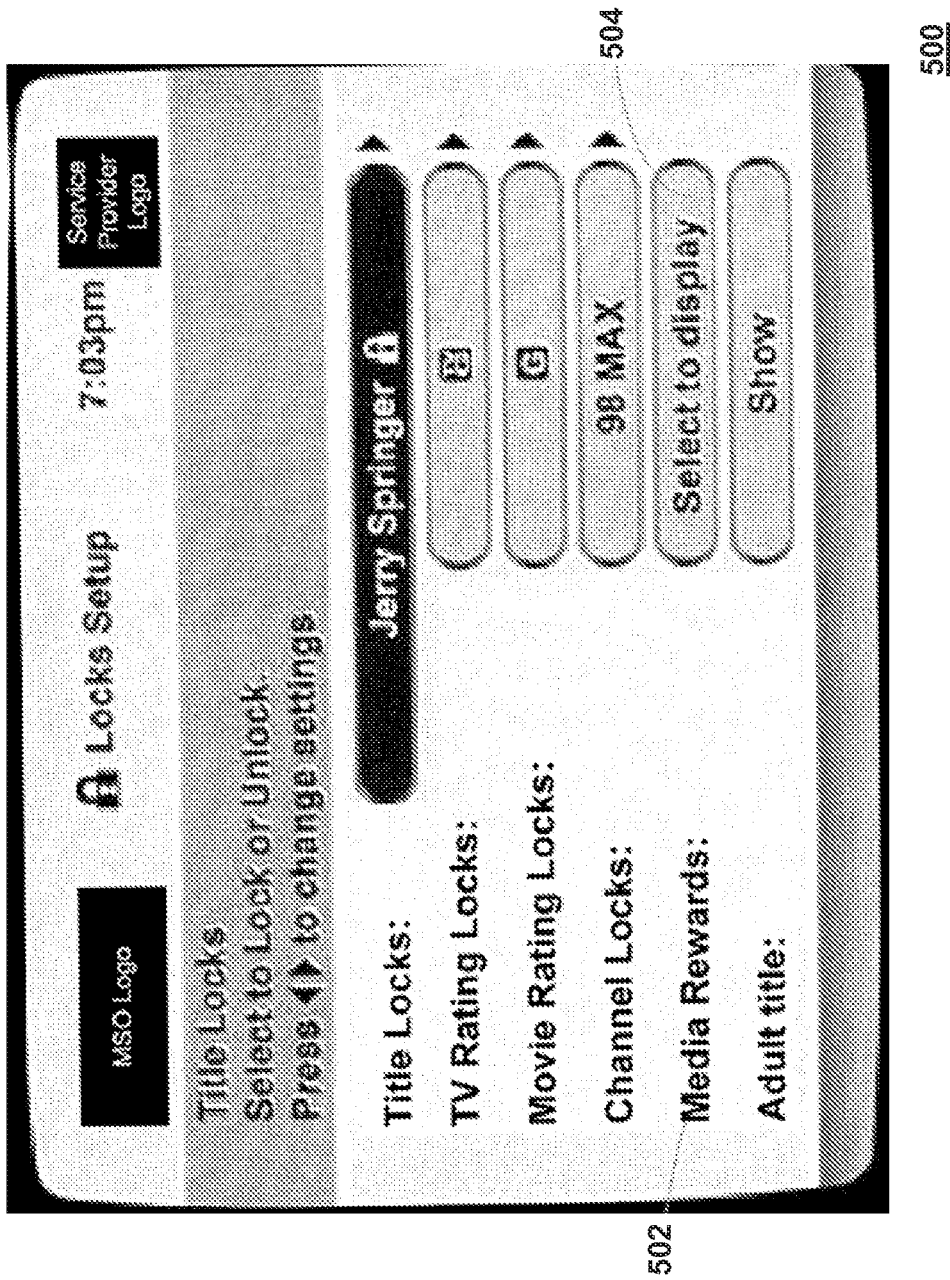
FIG. 5 shows an illustrative display screen showing a locks setup menu in accordance with one embodiment of the present invention.

FIG. 5 shows illustrative locks setup display screen 500 showing an alternative method of accessing the interactive content control application from within an interactive television program guide in accordance with one embodiment of the invention. The interactive television program guide application may already support various types of locking and parental control features. These locks may include program title locks, television and movie ratings locks, channel locks, etc. "Media Rewards" listing 502 may be incorporated into locks setup display 500 for easy and seamless access to the interactive content control application. Upon selecting link 504 using input device 108, the user may automatically access the interactive content control application in privileged mode. A single parental control access code entry may have already validated the user prior to accessing locks setup display 500 or a supplemental parental control access code entry overlay (e.g., parental control access code entry overlay 302 or create parental control access code overlay 202) may be displayed to the user after selecting link 504.

Figure 6:
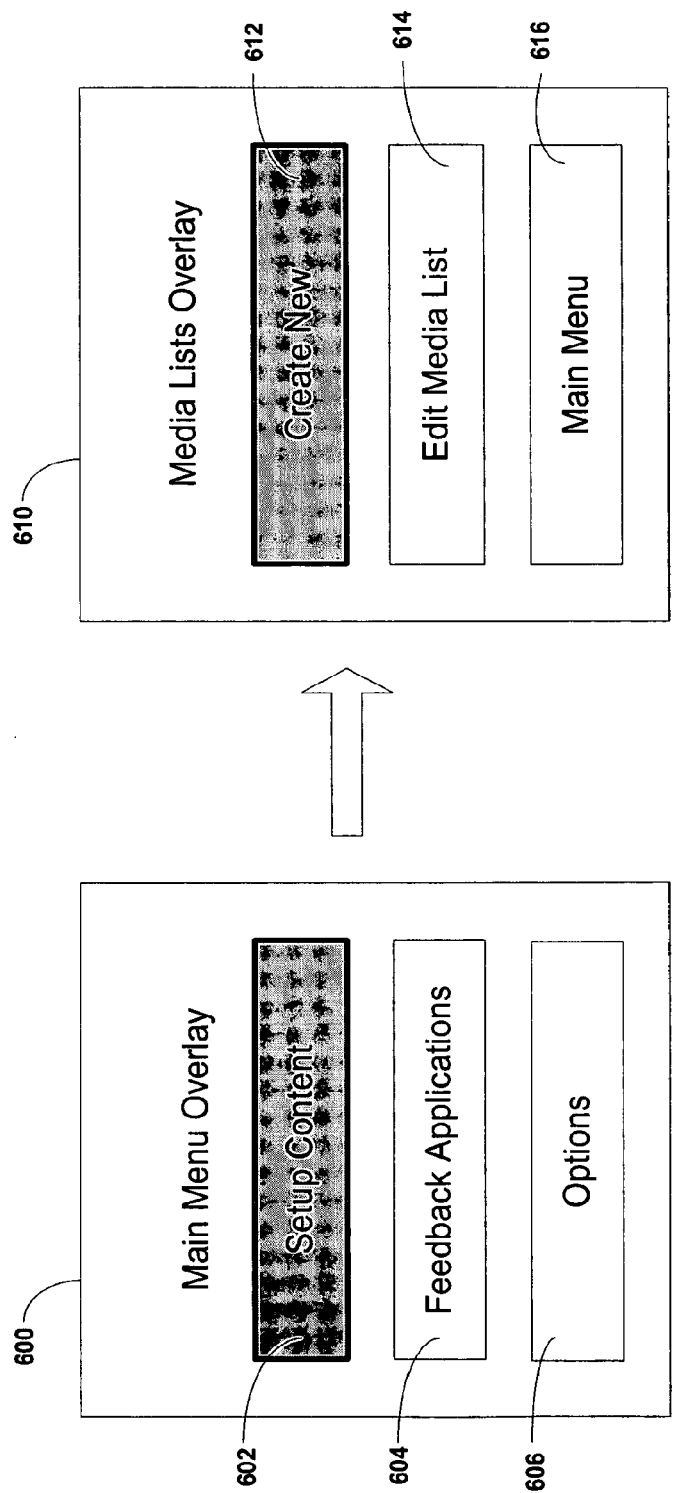
FIG. 6 shows privileged mode main menu and media lists overlays in accordance with one embodiment of the present invention.

FIG. 6 shows illustrative administrative main menu overlay 600 and media lists overlay 610 in accordance with one embodiment of the invention. Upon successfully inputting a valid administrative parental control access code via parental control access code entry overlay 302 (FIG. 3) or creating a new administrative parental control access code using create parental control access code overlay 202 (FIG. 2), the supervisor may enter privileged mode and be presented with main menu overlay 600. Main menu overlay 600 may include several selection options, including media lists selection 602, feedback applications selection 604, and options selection 606. Via options selection 606, an authorized supervisor may add or remove supervisors and access permissions, setup and remove media content sources, and configure user profiles.

By selecting media lists selection 602 from main menu overlay 600 the supervisor is presented with several media list management selections in media lists overlay 610. The interactive content control application primarily operates on media list structures. These structures may be stored in database 112 in any convenient manner. For example, in one embodiment, tables in a relational database are used to store user media lists of media content.

Media lists specify an ordered sequence of media content to be presented on user equipment 102 during a specific time window, such as from 5:00 PM to 7:00 PM. The inclusion of media content into a media list means that the supervisor has deemed this material to be appropriate for viewing at the scheduled time the media list is to execute. Interactive content control application 106 may present the scheduled media content in order during the media list runtime. Users may also choose to present media content from a set, or palette, of permitted media content, if media palettes are defined and included in the media list.

Upon being presented with media lists overlay 610, the supervisor may choose to create a new media list, edit an existing media list, or return to main menu overlay 600. By selecting edit media list selection 614, the interactive content control application provides a supervisor with the opportunity to view, edit, delete, and schedule an already existing media list. In some embodiments, links to existing media lists may be listed directly on media lists overlay 610 for quick, one-step access to a specific media list's management functions.

Content within media lists may be automatically prerecorded for later playback or scheduling in a media list. This feature may be useful if some or all of the content a supervisor wishes to include in a media list is broadcast (or is otherwise made available) prior to the scheduled media list runtime. For example, at least one Saturday morning broadcast cartoon included in a media list to be presented on Sunday morning may be automatically recorded on Saturday morning and presented as part of the Sunday morning media list. In some embodiments, Internet resources and interactive applications are exempt from the prerecording feature. However, in at least one embodiment, Internet websites, newsgroups, and other network content are cached (e.g., via capture of HTML code, linked content, and/or RSS feeds) to the user equipment (or a network location) for later presentation in a user media list. In accordance with the invention, prerecorded or partially prerecorded media lists are scheduled for presentation in the same manner as traditional media lists (e.g., via edit media list selection 614 or create media list selection 612). From the user's perspective, prerecorded or partially prerecorded media lists may be indistinguishable from "live" media lists.

Figure 7:
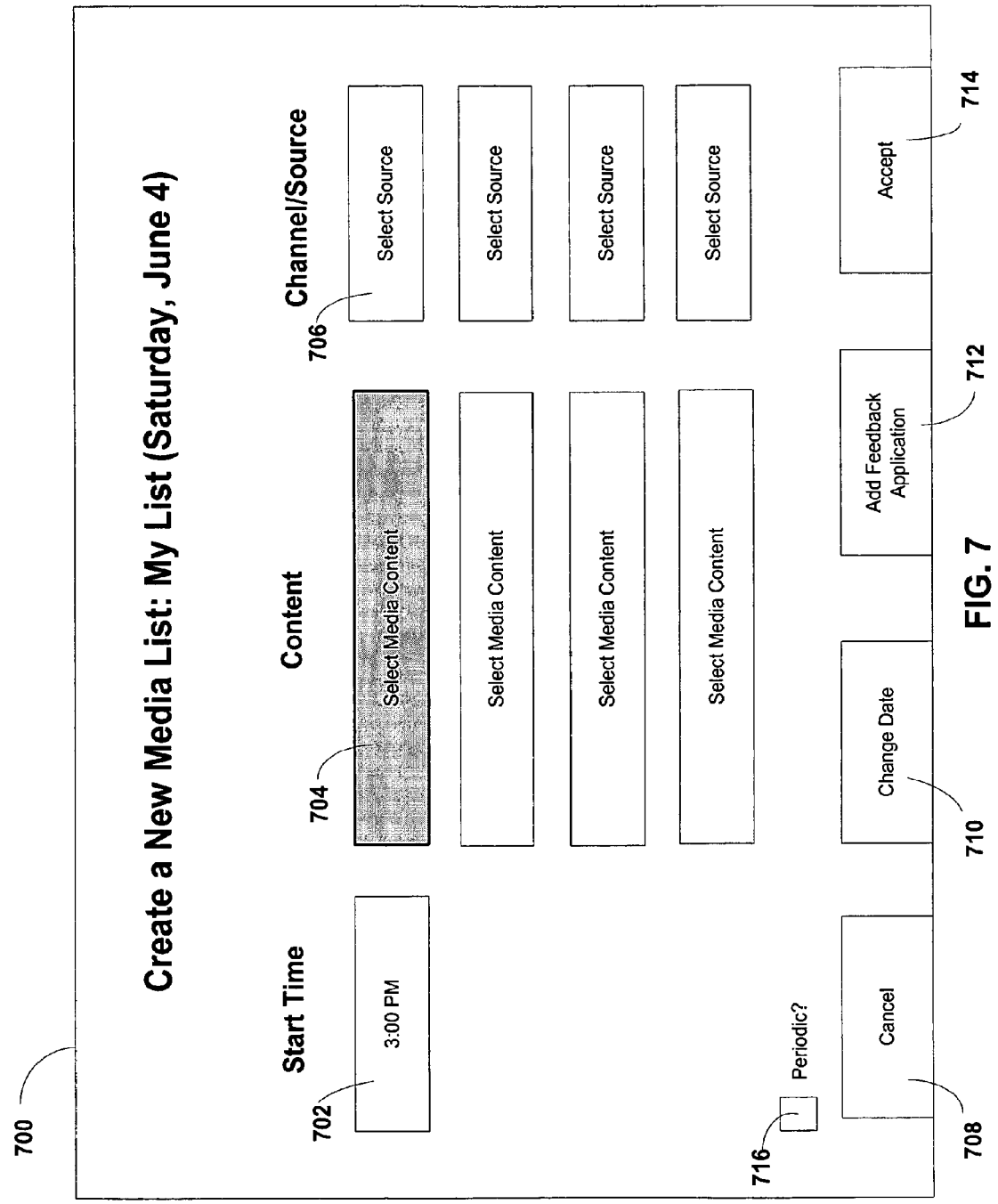
FIG. 7 shows an illustrative media list creation screen in accordance with one embodiment of the present invention.

Upon selecting create media list selection 612, the interactive content control application may present the supervisor with a manual content input screen, as illustrated in FIG. 7 in accordance with one embodiment of the present invention. A default playback start time may be presented to the supervisor in time selection 702. Upon selecting a content slot in content column 704, media content data may be presented to the user in grid or table form. This media content data may be at least partially derived from interactive television program guide data. The user may scroll or page up and down through the grid or table to view all the available media content accessible by user equipment 102 (FIG. 1). Station names, channel numbers, times, and program or movie ratings may also be provided next to each program, if applicable. The user is given the opportunity to select and add individual media content to a new media list of media content. Series may be added by program name (e.g., "The Simpsons") or by date/time and channel combination.

The supervisor may select and add media content to media list content slots in content column 704 one at a time or select multiple media content entries from a grid display of program listings displayed by an interactive television program application. The multiple media content selections from the interactive television program guide screen may fill all or part of the available content slots present in content column 704. If more content slots are needed, the interactive content control application generates a scrollable list display. If the selected media content does not have a specific runtime associated with it (e.g., as is often the case with Internet resources, such as websites), the supervisor may select how long the content should be presented by configuring the content via options selection 606 of main menu overlay 600 (FIG. 6). If desired, to narrow the available media choices, the supervisor may edit the source of the media content by selecting the source name in source column 706. For example, source column 706 may be set to "DVR" to view a listing of only recorded media contained in attached media recorders, recording device 110, storage devices, or attached gaming devices.

If the supervisor wishes to set up a periodic media list, periodic checkbox 716 may be selected. Upon submitting the media list to the content control application via accept media list selection 714, the supervisor will be queried for the periodic scheduling attributes via a periodic setup screen (not shown). Periodic scheduling attributes may include, for example, the frequency of the recurrence (e.g., daily, weekly, monthly, and/or yearly) and the day of week and range of recurrence. For example, a supervisor may setup a periodic media list to be presented on user equipment 102 weekly each Saturday morning starting at 7:00 AM for 10 Saturday mornings, starting June 1. In this way, a media list may run without the need for specifying specific Saturday dates (although specific dates may be configurable as well, if desired). If a media list is designated as periodic, the supervisor may select a broadcast series without specifying a particular episode. The episode currently being broadcast or delivered to the user equipment a the media list execution time will be presented. If an episode of the series is not currently being broadcast or delivered to the user equipment, the most recently recorded or broadcast episode will be presented.

In some instances, a supervisor, who creates a periodic media list, may be unaware of the specific content included in the list. For example, if a supervisor creates a periodic media list using channel or station selections, the channel or station operator may broadcast a children's educational program on one morning during the media list runtime and a news segment on another morning during the media list runtime. This may allow a supervisor to setup a periodic media list to present unknown media content.

To prevent potentially inappropriate content (e.g., content exceeding a certain rating) from being included in a periodic media list, interactive content control application 106 may look ahead to analyze content attributes of future programming included in the periodic media list. For example, if a weekly periodic media list is created to present the FOX channel every Monday afternoon from 4:00 to 6:00 PM, the interactive content control application may access program content attributes, including rating information, associated with content to be broadcast on the FOX channel on Mondays from 4:00 to 6:00 PM. Typically, several weeks of program content information is available locally on user equipment 102; however, the content control application may access more distant content information by contacting a content or data source. The supervisor of the interactive content control application may specify the look-ahead range.

In some embodiments, if the interactive content control application determines that inappropriate media content is scheduled to be broadcast during the periodic media list runtime, a warning dialog (not shown) may be presented to the supervisor. This dialog may display the potentially inappropriate content and prompt the supervisor to confirm the selection(s). In some embodiments, the supervisor is permitted to select alternate content to replace the inappropriate content. Alternatively or additionally, the interactive content control application may suggest alternate content to replace the inappropriate content. Alternate content suggestions may be derived from supervisor, system, or third-party data. For example, content with the same rating or attribute information as another element in the media list may be selected to replace the inappropriate content. In other embodiments, a periodic media list is automatically marked inactive when the content control application determines that inappropriate content is scheduled to be presented on the user equipment. In still other embodiments, the list's periodicity may be limited to the range of look-ahead program data available to user equipment 102.

In yet another embodiment, a filter may dynamically screen content outside the scope of look-ahead listing data that the filter encounters that exceeds a supervisor-defined rating limit. At the time of encountering this content, the filter can blank out the program, substitute appropriate content from a related channel or pre-recorded content, or any other appropriate action that would prevent the user from seeing content inappropriate to their age or situation.

In yet another embodiment, as look-ahead listings data and program information becomes available, the interactive television application automatically scans this information to determine if inappropriate content will, at some time in the future, be showing on any of the designated channels and times that have been configured into the periodic playlist. If so, the interactive content control application can mark these programs or alert the supervisor in some other appropriate fashion (e.g., email or text message alert) that this conflict will occur. By dynamically looking ahead in a program listings database that may contain two to three weeks of future program schedules, the application can alert a supervisor and provide sufficient time for the supervisor to correct any problems with the periodic playlist before they occur.

Still referring to FIG. 7, to alter the date or presentation, the supervisor may select change date selection 710. The supervisor is then allowed to select a new day of the week or date for the presentation of the current media list. To add an interactive feedback application to the media list, the supervisor may select add feedback application selection 712. Upon selecting add feedback application selection 712, the content control application may contact third-party source 120 or content source 130 for a listing of available interactive feedback applications. If any feedback applications are stored on the user equipment (e.g., on recording device 110), these applications are also displayed to the supervisor in a selection list (not shown) for inclusion in the media list. Once a feedback application is selected, it may be inserted at any desired point within the media list. To cancel the media list creation process and return to main menu overlay 600, the supervisor may select cancel selection 708.

Figure 8:
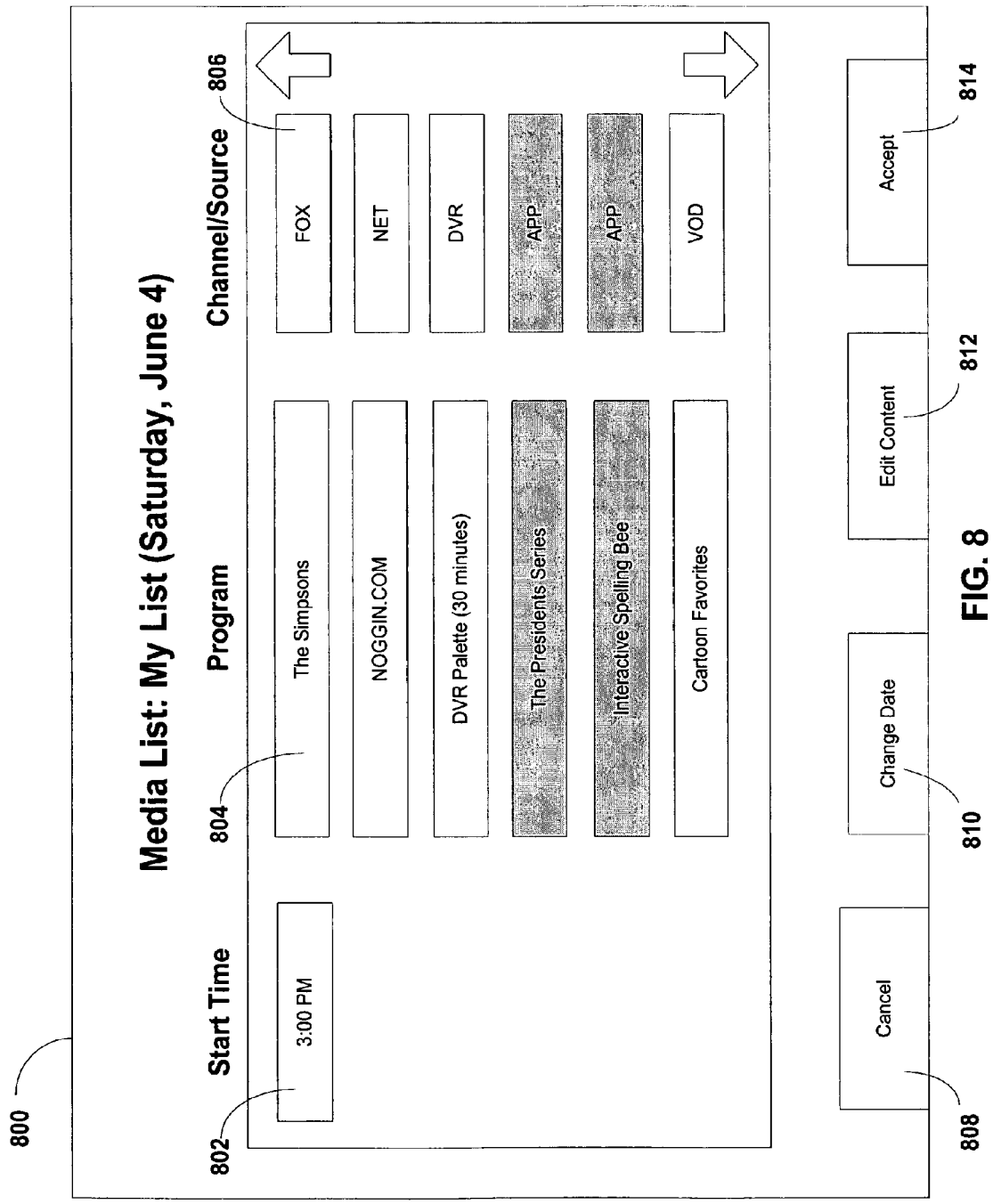
FIG. 8 shows an illustrative media list display screen in accordance with one embodiment of the present invention.

FIG. 8 shows illustrative media list confirmation screen 800 in accordance with one embodiment of the present invention. Time selection 802 lists the start time that the media content listed in program column 804 will be presented on display device 104. If desired, program column 804 may contain a combination of specific media content, such as a user-selected broadcast television program, and palettes of media content, such as, for example, a user-defined DVR palette. The source or station of the content may be selected via channel/source column 806. For Internet resources, channel/source column 806 may display the "NET" source, indicating that the Internet may be accessed for the presentation of this segment. For recorded programs, channel/source column 806 may display the "DVR" source, indicating a user recording device may be accessed for the presentation of this segment. For VOD programs, channel/source column 806 may display the "VOD" source, indicating a video-on-demand or pay-per-view ("PPV") channel may be accessed for the presentation of this segment. For games or removable storage (e.g., DVD) based content, channel/source column 806 may display the "GAME" or "DVD" source (not illustrated). For interactive feedback applications, channel/source column 806 may display the "APP" source, indicating a application with user feedback may be accessed for the presentation of this segment. Display screen 800 is merely illustrative and other screen layout configurations may be used without departing from the spirit of the invention.

Still referring to FIG. 8, the supervisor may modify the displayed media list using edit content selection 812. For example, the supervisor may re-order the media list, change one or more entries within the media list, or adjust the channel/source of an entry within the media list. To alter the day of the week or date of presentation of the media list, the supervisor may select change date selection 810. If the supervisor modifies the time or channel fields of an entry within the media list and the entry corresponds to a broadcast program, the interactive content control application may automatically update program column 804 with the appropriate broadcast program aired on the new channel and the newly selected time. To save the media list as presented in display screen 800, the supervisor selects accept selection 814. To abandon the media list without saving, the supervisor may select cancel selection 808 to return to the manual content input screen.

Figure 9:
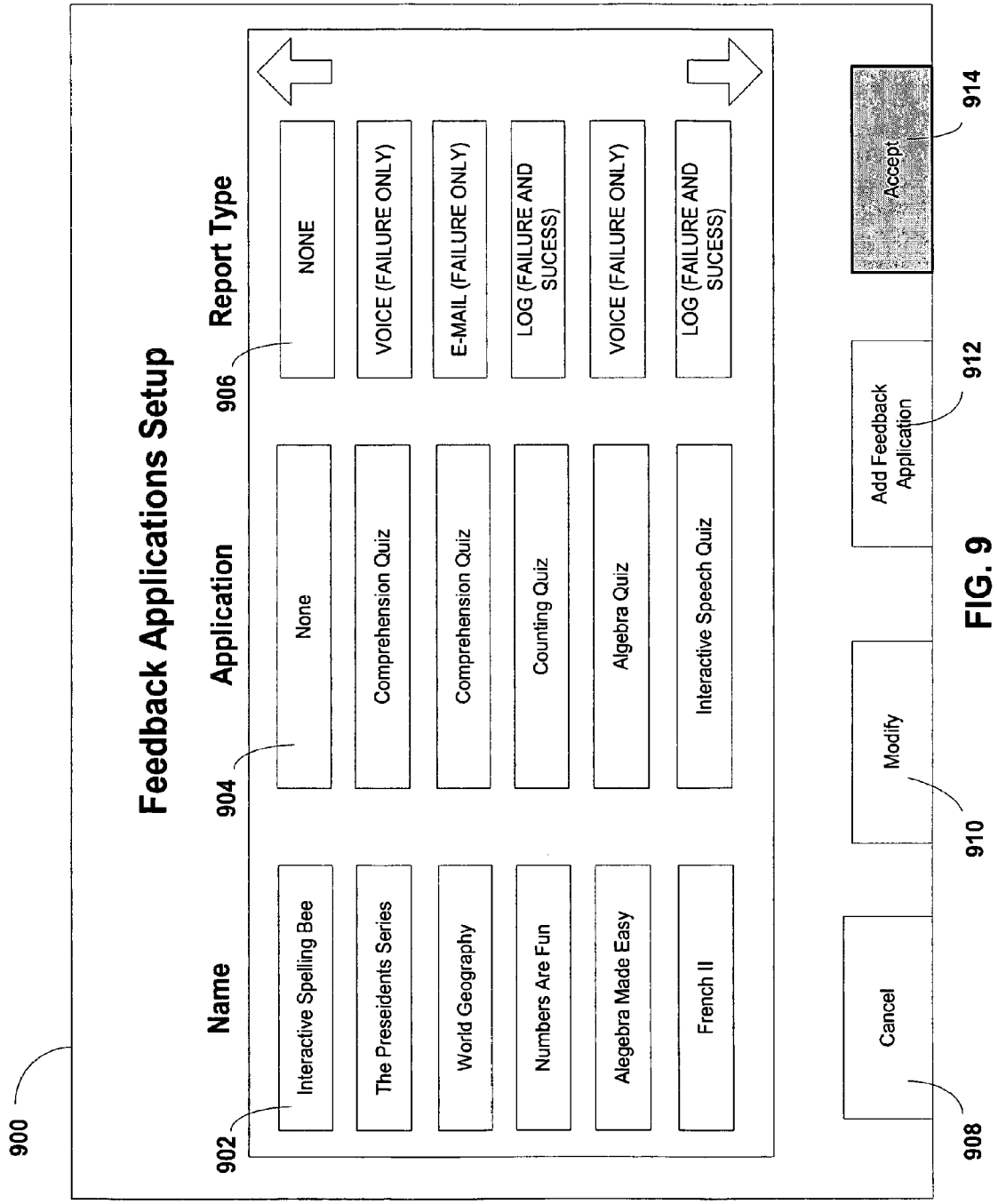
FIG. 9 shows an illustrative feedback applications setup screen in accordance with one embodiment of the present invention.

FIG. 9 shows illustrative feedback applications setup screen 900 in accordance with one embodiment of the present invention. Feedback applications may be stored locally on user equipment 102 (e.g., on recording device 110) or accessed on-demand from third-party source 120 or content source 130 (FIG. 1). Name column 902 includes unique media content names for available feedback applications. The feedback applications listed in name column 902 may have one or more associated feedback segments listed in application column 904. These feedback segments may include any programming (video, audio, and/or multimedia) that requires some user input, such as interactive games, websites, quizzes, and/or comprehension tests. Some feedback applications may not have an associated feedback segment listed in application column 904. For example, in some instances the feedback content segment may be interactive by its very nature and may not require an associated feedback segment to obtain user input. Interactive games and websites are a common example of feedback content that typically do not have associated feedback segments. In these instances, the supervisor may select "None" in application column 904.

There are also several reporting options defined on a per feedback application basis in feedback applications setup screen 900. The interactive content control application 106 (FIG. 1) may report on successful feedback application completions, unsuccessful feedback application completions, both successful and unsuccessful completions, or neither successful or unsuccessful completions. These reports may be delivered via any available communication connection (e.g., high-speed network link, telephone line, and/or wireless data link). The user selects the desired reporting option in report column 906 for each interactive feedback application. Feedback reports may be automatically generated and delivered to external users (e.g., parents) via email, voice call, text message, or any other mode of communication accessible by the user equipment. In addition, reports may be delivered to designated third-party monitor applications running at third-party source 120 (FIG. 1). Third-party source 120 may be connected to a communications facility (not shown), such as an Internet provider or telephone carrier. The third-party monitor application may then, in turn, be responsible for delivering reports to external users. Report may indicate the time and date of the feedback application completion, the result of the completion, the name of the media content associated with the feedback application, the graded score of the feedback application (if available), and any other statistic, status, or data accessible by the content control application. If desired, the report may also be logged or cached to the user equipment. Reports may be delivered immediately upon competition of a feedback application, or reports may be batched and sent at some user-specified time. Reports may be delivered to multiple recipients.

To discard feedback applications setup screen 900 without saving changes, the supervisor may select cancel selection 908. To change one or more of the listings in name column 902, feedback column 904, or report column 906, the supervisor may select modify selection 910. To insert or setup a feedback application not listed in display 900, the supervisor may select add feedback application selection 912. In some embodiments, upon selecting add feedback application 912, the supervisor is presented with a feedback application purchase screen for entering billing or account information. New feedback applications may be purchased and downloaded or otherwise made available to the user equipment on-demand, if desired. To discard feedback applications setup screen 900 and save the changes, the supervisor may select accept selection 914.

FIG. 10 shows an illustrative feedback application screen in accordance with one embodiment of the invention. For example, comprehension quiz screen 1000 may be presented to a user immediately after the presentation of required media content on the U.S. Presidents. Questions are displayed to the user to test understanding and comprehension of the previously presented media content. Question box 1002 may present information and related questions to the user. Several answer choices may be displayed in answer area 1004. The user uses input device 108 (FIG. 1) to select the desired answer choice. To continue to the next question in the comprehension quiz, the user may select next selection 1006. To quit the comprehension quiz, the user may select cancel selection 1008.

Figure 11:
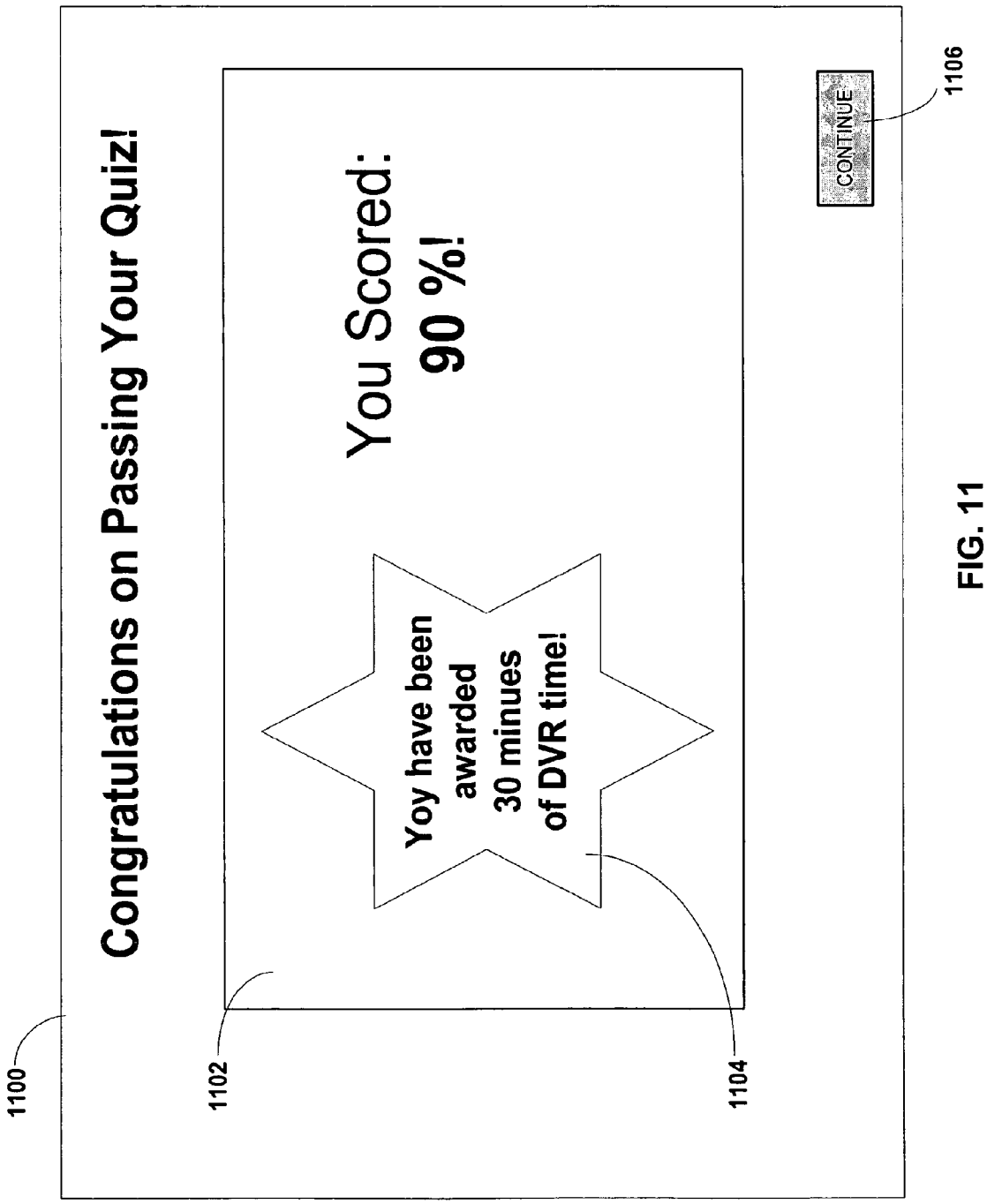
FIG. 11 shows an illustrative successful feedback application completion screen in accordance with one embodiment of the present invention.
Figure 12:
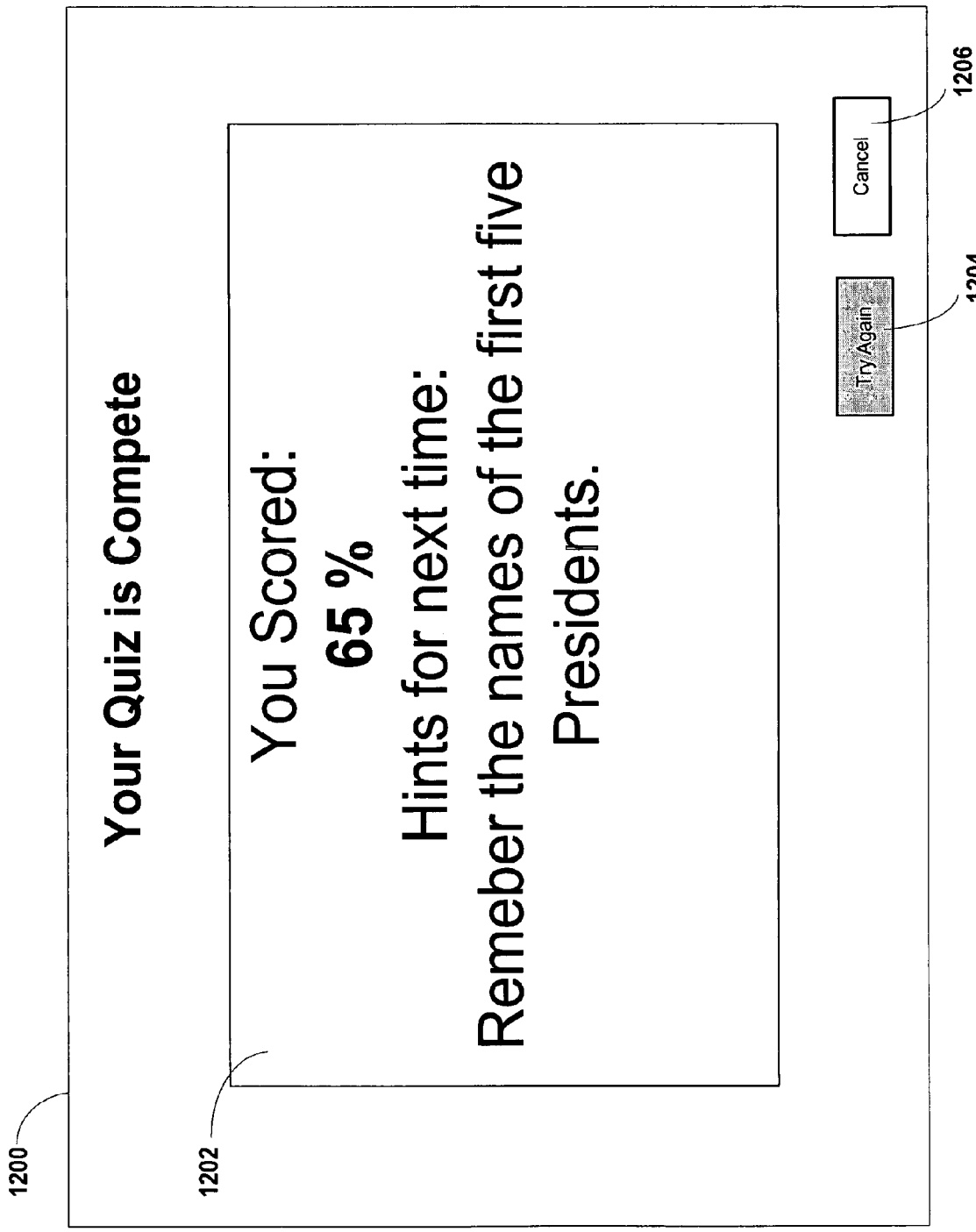
FIG. 12 shows an illustrative unsuccessful feedback application completion screen in accordance with one embodiment of the present invention.

Upon completing the interactive feedback application, a user is presented with a summary completion screen. This screen may include successful completion screen 1100 of FIG. 11 or unsuccessful completion screen 1200 of FIG. 12. The interactive content control applications scores the user's input at the conclusion of the feedback application. If the user canceled the feedback application without completing all the exercises or answering all the questions, the content control application may mark the unanswered or uncompleted portion as incorrect. Successful completion screen 1100 is presented to a user if the user has fulfilled the user-specified competition criteria associated with the feedback application. For example, a certain percentage score may be required to signify successful completion of a feedback application. Score information overlay 1102 may display the user's numeric percentage score. Additionally, some media privilege may also be granted to the user upon successfully completing an interactive feedback application. In the example of FIG. 11, a 30-minute quota of DVR time is awarded to the user as a reward for successfully completing the feedback application. Other rewards may include, for example, a designated quota of Internet or VOD viewing time, specific media content, a recording device space allotment (e.g., 50 MB of space on recording device 110), or any combination of aforementioned rewards. Rewards may be viewed immediately after the completion of the feedback application or after the media list runtime has terminated. The user may discard successful completion screen 1100 by selecting continue selection 1104.

In one embodiment, rewards are credited to the current user at the local user equipment only. Upon powering off the system or some part of the user equipment, the rewards for the current user are lost. In other embodiments, rewards are recorded or saved to database 112, recording device 110, or a network location. In these embodiments, rewards may be available for redemption at the local user equipment at a later date.

In some embodiments, user rewards are portable. If the user rewards are saved to a network location (e.g., at database 122 of third-party source 120 (FIG. 1)) these rewards may be associated with some unique identifier (e.g., username and password established by the user). In this way, rewards may be credited on a per-user basis. This also allows rewards to be redeemed at different locations from where the rewards were earned. Upon proper authorization of a user at any user equipment in the system, third party source 120 may access a record of a particular user's rewards and deliver reward information to any user equipment in the system. Users may then access the user equipment to redeem the rewards on the new user equipment.

Unsuccessful completion screen 1200 (FIG. 12) is presented to a user if the user has obtained a failing score on the feedback application. Score information 1202 may display the numeric percentage score to the user along with hints for completing the feedback segment next time the user attempts the segment. The user may discard unsuccessful completion screen 1200 by selecting cancel selection 1206. In some embodiments, the user is given the option to be re-presented with the feedback segment (e.g., try to pass a comprehension quiz again) by selecting try again selection 1204. In these embodiments, the media segment associated with the interactive feedback application (if available) may be presented to the user before the user is permitted to access the feedback segment for a subsequent time. In some embodiments, a quiz that the interactive feedback application provides on subsequent attempts will be regenerated or randomized each time to ensure that the user is not just repetitively guessing.

Upon completing an interactive feedback application, the content control application may take several courses of action, depending on the established user preferences. For example, if feedback reports are enabled (e.g., via report column 906 of feedback applications setup screen 900 of FIG.

9), the content control application may notify an external user of the feedback application completion as well as the user's score or result, if applicable. If the user obtains a passing score on the feedback application, the system may report the successful completion and continue presenting the media list to the user. For example, the user may be presented with entertaining media content that is scheduled immediately after the feedback application in a media list.

If the user does not successfully complete the interactive feedback application, the content control application may similarly report the unsuccessful completion (and user score, if applicable) to one or more external users. At this point, in some embodiments the user may select to restart the media list at the failed feedback application and attempt to successfully complete the feedback application again. In other embodiments, if a user does not successfully complete the interactive feedback application access to media content is completely or partially restricted. Alternatively or additionally, enter locks parental control access code overlay 302 (FIG. 3) may be displayed, prompting for an administrative parental control access code input. In this embodiment, only the input of an administrative parental control access code may unlock the viewing restrictions.

If the content control application is programmed to restrict access after an unsuccessful feedback application completion, the content control application may be remotely unlocked or reset by an authorized supervisor. In one embodiment, a randomly generated access code is transmitted to a remote supervisor along with a feedback application completion report. The remote supervisor may return the access code to the content control system to restart the user list at any appropriate point (e.g., at the start of the interactive feedback application that was not successfully completed). An external supervisor may return the access code using any form of communication accessible by the user equipment. For example, in one embodiment a web interface is used to send remote commands to the content control application. Communication between the web interface and the interactive content control application may be secured using traditional SSL or any other encryption/authentication protocol. Instructions delivered via the web interface may perform any command an authorized supervisor actually at the user equipment may carry out, including, but not limited to, restarting the user list at a designated point, restarting the most recent feedback segment, powering down some part of user equipment 102 (FIG. 1), granting/revoking user rewards, etc. In another embodiment, external commands are delivered via return email or text message to the user equipment. The content control application may parse the email or text message for valid content control instructions and execute the received instructions on the user equipment.

Figure 13:
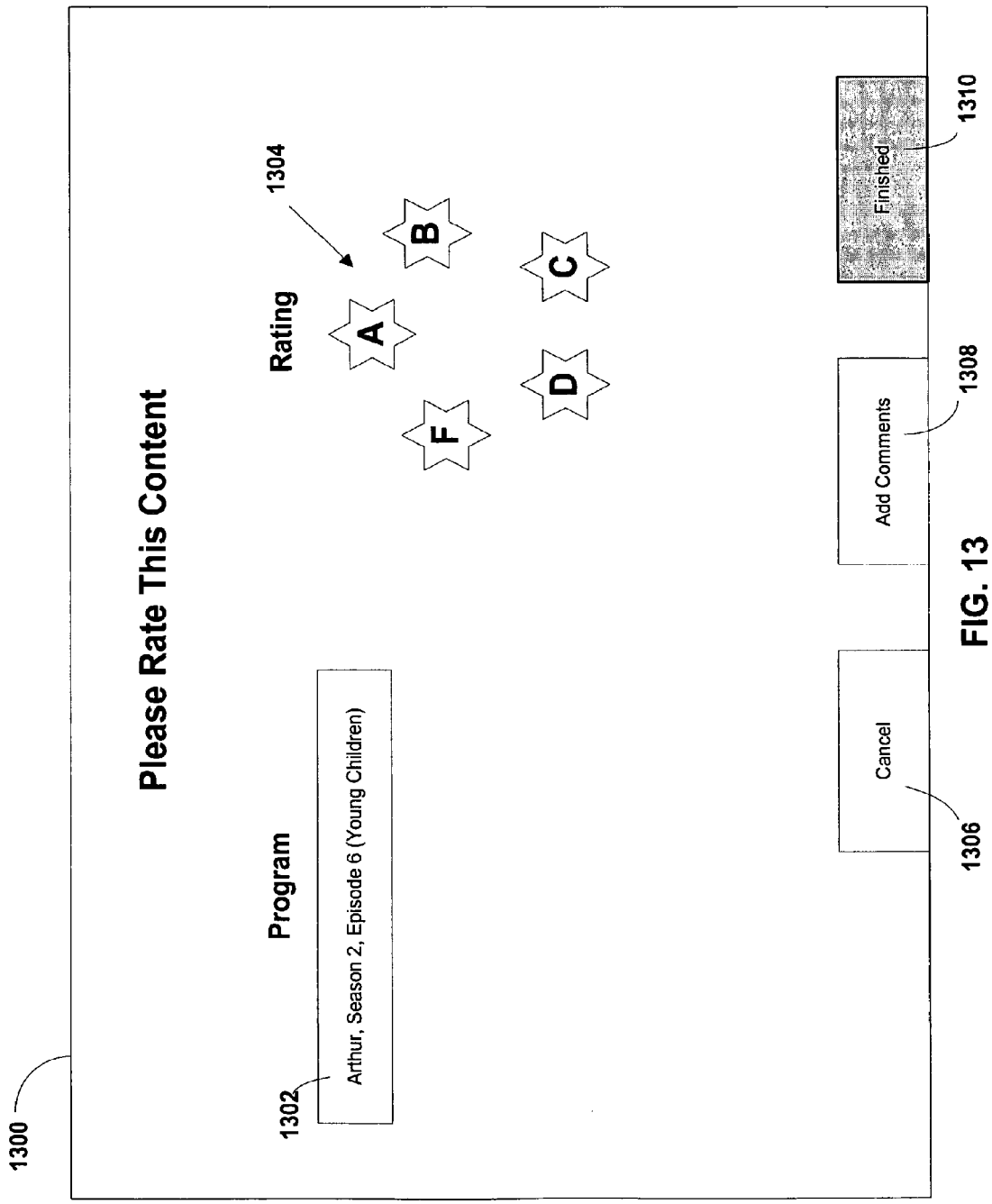
FIG. 13 shows an illustrative display screen for rating media content in accordance with one embodiment of the present invention.

FIG. 13 shows an illustrative display screen for rating media content in accordance with one embodiment of the invention. Ratings display 1300 may be presented to a user at any convenient time during or after the media list presentation. For example, the interactive content control application may present ratings display 1300 to a user after each element is presented in a media list. In other embodiments, ratings display 1300 is presented at the conclusion of the entire media list. Ratings display 1300 permits a user to rate, or rank, media list content according to some pre-defined rating criteria. In the example of FIG. 13, media content to be rated or ranked is displayed in program column 1302. Program column 1302 may include one or more elements to be rated, depending, for example, on the frequency of the presentation of ratings display 1300. The user may use an input device to highlight and select the desired rating from ratings selection 1304. In the example of FIG. 13, ratings selection 1304 includes a general letter ratings system (i.e., A, B, C, D, or F), but any suitable rating or ranking criteria (e.g., a numerical rating system) may be used. In addition, several ratings categories, such as plot, character development, and/or special effects, may be defined and individually rated.

User ratings submissions may be saved to a log file, storage device (e.g., recording device 110 of FIG. 1), memory, or a network location. An authorized supervisor in privileged mode may retrieve rating submissions associated with media list content to assist the authorized supervisor in setting up and maintaining media lists. For example, an authorized supervisor may choose to discontinue or remove media content that consistently receives poor ratings from media list users. In some embodiments, rating submissions received from ratings display 1300 are used by the interactive content control application in suggesting media content for inclusion in a media list. For example, media content that receives higher ratings may be suggested for inclusion in media lists more often than media content that receives lower ratings.

Still referring to FIG. 13, to discard ratings display 1300 without submitting a rating, a user may select cancel selection 1306. In some embodiments, ratings display 1300 may not be canceled. In these embodiments, a user must rate the media content listed in program column 1302 before continuing. If a user wishes to add more detailed comments to a rating submission, the user may select add comments selection 1308. Upon selecting add comments selection 1308, a text field may be presented to the user for the input of text comments relating to the rating submission. Alternatively or additionally, a menu of comments (e.g., "love it," "I want more like this," "this rocks," "never again" can be provided for ease of feedback. In some cases these comments are based on the content itself such as "more sports like this please," or "less baseball, more football" for sports or baseball program comments, or "I love SpongeBob" as appropriate for a SpongeBob Square Pants rating.

Figure 14:
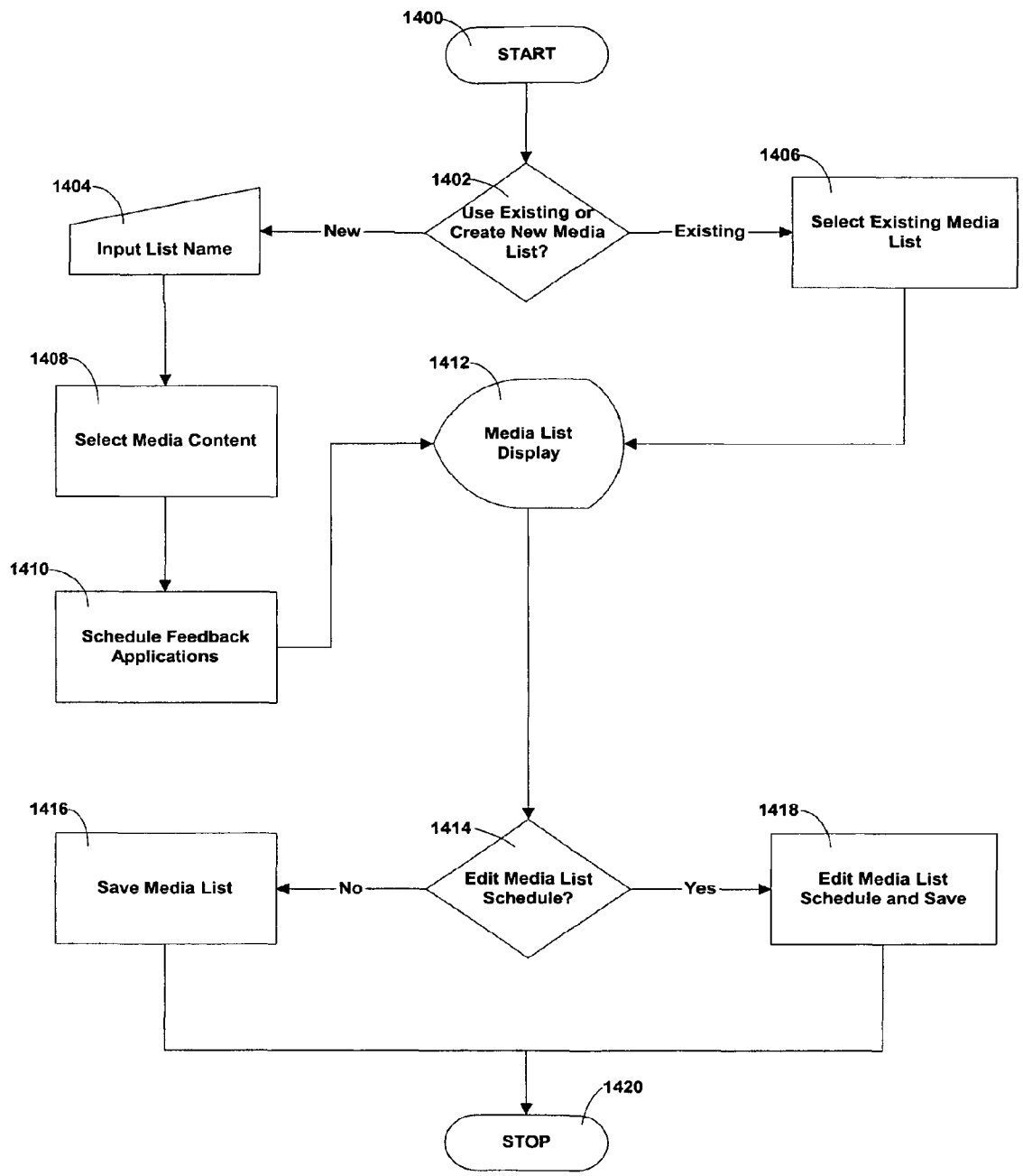
FIG. 14 shows a flow chart of an illustrative method for selecting a new or existing media list in accordance with one embodiment of the present invention.

FIG. 14 shows an illustrative method for scheduling a new or existing media list in accordance with one embodiment of the invention. The supervisor starts the media list scheduling process at start step 1400. In some embodiments, this step may correspond to the selection of create new media list selection 612 of media lists overlay 610 (FIG. 6). At decision 1402, the content control application determines if the supervisor has selected to create a new media list or use an existing media list. If a determination is made that the supervisor has selected to create a new media list, the supervisor is given the opportunity to name the new media list at name input 1404. The user may input data using any available input device 108 of user equipment 102 (FIG. 1). If a duplicate or conflicting media list name is entered, the supervisor may be prompted to choose a different name or overwrite the existing media list with the same name.

At step 1408 the supervisor selects media content for inclusion in the new media list. In some embodiments, step 1408 may correspond to new media list creation screen 700 (FIG. 7). Content selections are typically made by the user highlighting the desired media content using an input device and pressing the "OK" or "Select" button. The supervisor may select media content one program at a time or make multiple selections of media content from an interactive television program guide listing screen. For example, the supervisor may select broadcast programming, VOD programs, recorded content, interactive applications, and Internet resources to fill a new media list.

At schedule step 1410, the supervisor schedules at least one feedback application within the media list for execution. For example, the supervisor may schedule a required feedback application with a comprehension quiz on the U.S. Presidents after an hour of entertaining programming. If the user successfully completes the feedback application, entertaining programming may be scheduled for presentation to the user as a reward.

If the supervisor wishes to use an existing media list, the supervisor selects the existing list at selection step 1406. Upon selecting an existing list or completing schedule step 1410, media list display 1412 is presented to the supervisor. The display lists the order of the content and feedback applications in the media list and its associated start date and time, as depicted in illustrative media list display screen 800 (FIG. 8). The supervisor may examine media list display 1412 for correctness, and the content control application determines at decision 1414 if the supervisor has selected to make any changes to the media list. If changes are desired, the supervisor edits the media list and saves the changes at edit step 1418. If no changes are desired, the media list is saved at step 1416 before the scheduling process is completes at step 1420.

Figure 15:
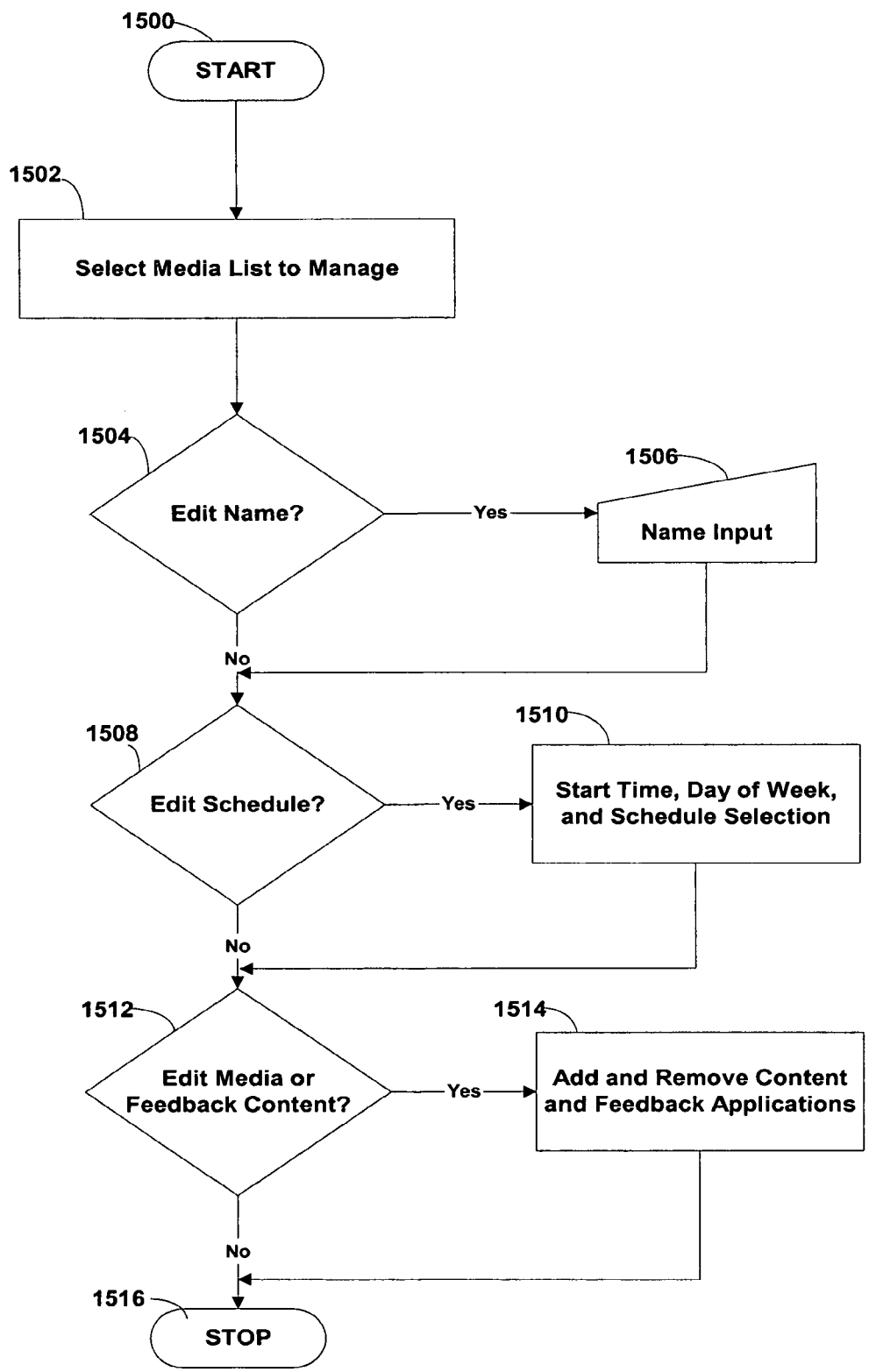
FIG. 15 shows a flow chart of an illustrative method for editing a media list or its associated launch attributes in accordance with one embodiment of the present invention.

FIG. 15 is a flowchart illustrating one method for editing an existing media list in accordance with one embodiment of the invention. The supervisor may start the edit process at step 1500 after, for example, selecting edit media list selection 614 from media lists overlay 600 (FIG. 6). The supervisor may also press an edit key or enter an edit command using input device 108 to arrive at step 1500. After being authorized by the content control application via a parental control access code overlay 200 (FIG. 2) or 300 (FIG. 3), the supervisor may select a media list to edit at step 1502. Supervisors with the appropriate permissions may edit any media list on the system; however, in one embodiment, supervisors may only be allowed to edit media lists that they have created. At decision 1504, the supervisor is given the opportunity to edit the name of the selected media list. If desired, the media list name may be modified using name input 1506. At decision 1508, the supervisor is given the opportunity to edit the day or time the media list is to be launched and/or terminated. If desired, day and time modifications may be made at step 1510. Next, at decision 1512, the supervisor is given the opportunity to edit the media list media content choices. If the user modified the day and/or time of the media list, the previous media list content may no longer be valid. In this case, the supervisor is required to select new content or mark the media list as inactive. The supervisor may edit the media content of the media list at step 1514. At this step, the user may be presented with media list display screen 800 (FIG. 8) for modifying the entries in the media list. The supervisor completes the edit process at step 1516.

Figure 16:
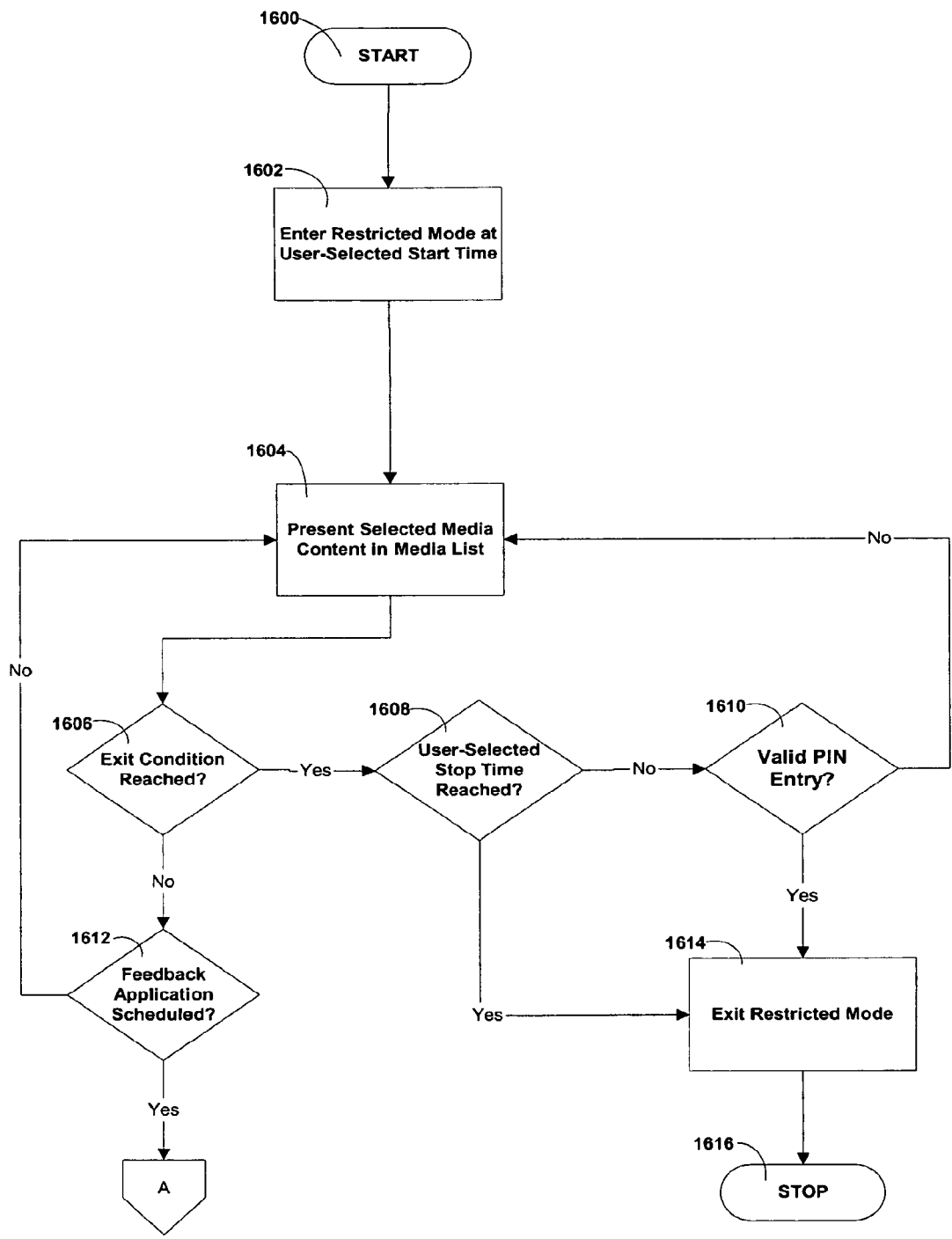
FIG. 16 show a flow chart of an illustrative method for presenting a media list to a user in accordance with one embodiment of the present invention.

FIG. 16 shows an illustrative method for presenting selected media content in a media list in accordance with one embodiment of the invention. The presentation process begins at step 1600. The content control application launches a media list at the user-specified start time associated with the media list. At step 1602, the user equipment enters restricted mode. During this time the user may not tune away from the content being presented in the media list without entering an administrative parental control access code. At step 1604, media content is presented to the user at user equipment 102 (FIG. 1) according to the order established in the media list.

Once media content is being presented on the user equipment, the content control application determines if an exit condition has occurred at decision 1606. Several exit conditions may be defined, including, for example, the start of another media list, the conclusion of the current media list, a parental control access code entry attempt, or a station, system, or media content interruption. If an exit condition is detected at decision 1606, the content control application determines if the media list has completed at decision 1608. If is has, the user exits restricted mode at step 1614. If the media list is still scheduled to run, the user may be prompted for an administrative parental control access code at step 1610. An invalid parental control access code entry causes the media list to continue at step 1604. A valid parental control access code entry terminates the media list and exits restricted mode at step 1614. If the content control application determines that an exit condition has not been reached at decision 1606, the content control application next determines if a feedback application is currently scheduled to be presented. If the next entry in the media list is not a feedback application, the content control application returns to present the selected media content in the media list at step 1604.

Figure 17:
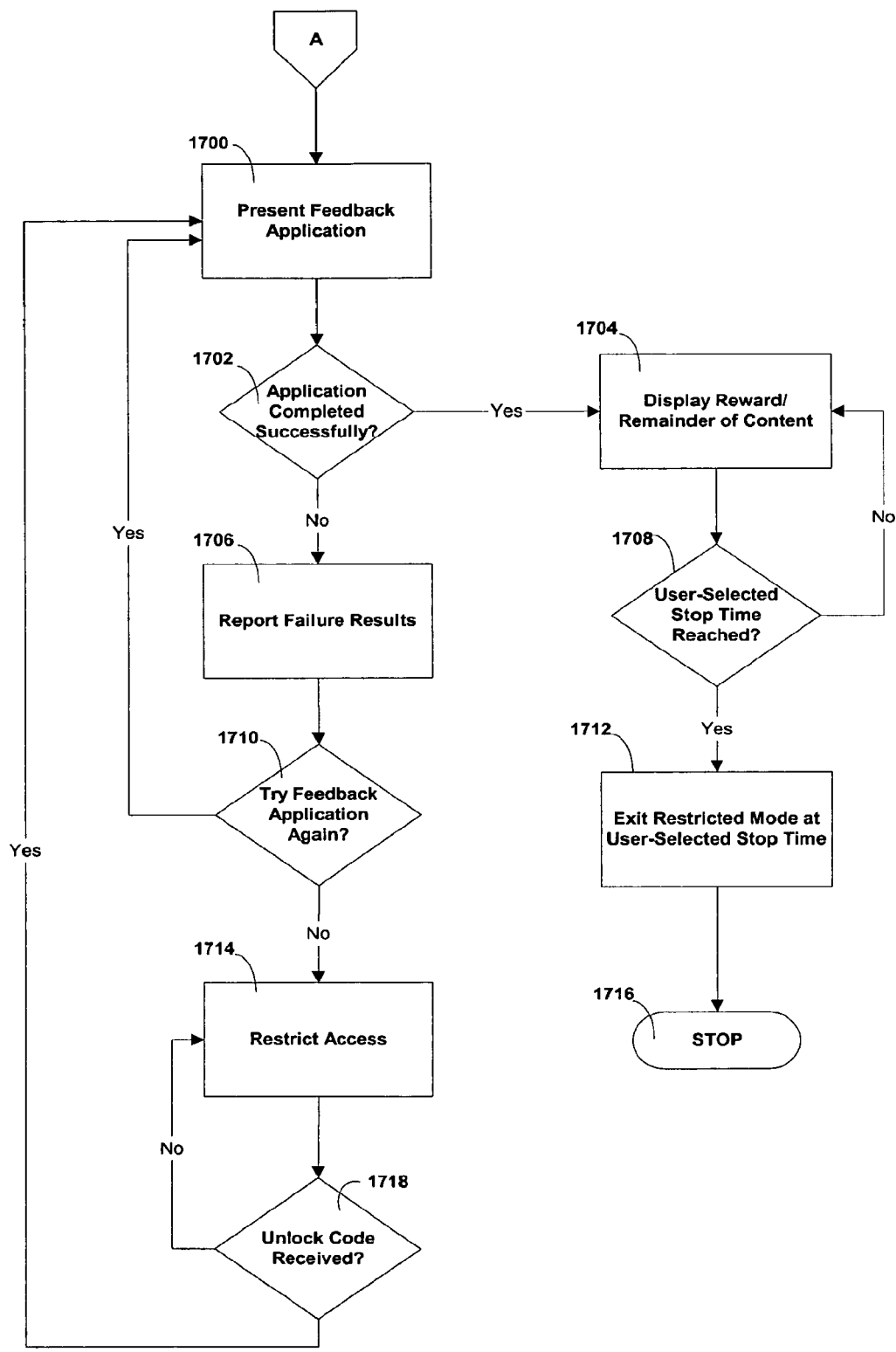
FIG. 17 shows a flow chart of an illustrative method for presenting feedback applications and rewards to a user in accordance with one embodiment of the present invention.

An illustrative method for executing and presenting the feedback application and rewards is depicted in FIG. 17. At step 1700, the feedback application is presented on the user equipment. Typically, this method involves a two-step process of presenting some media content and then presenting an interactive application requiring user input, such as a comprehension quiz. Although the feedback application may take many forms, at the conclusion of step 1700 some value is returned to the content control application. This value will be used to determine if the user has successfully completed the feedback segment of the interactive feedback application. Some feedback applications (e.g., interactive games and websites) may not exhibit distinct content and feedback segments. In these cases, there may be no need for a feedback segment to be presented after a media segment. For example, an interactive spelling bee that requires user input throughout the interactive media content, may return a value to the content control application immediately at the conclusion of the interactive media content. Such applications as the spelling bee can also provide evidence that a program is watched. For example, if a supervisor wants to know whether a user has been watching a particular program, in one embodiment, the present invention includes a chat-like feature that provides random queries to the user such as "please enter the current time," "are you still there," and "what are you having for dinner?" This is called a presence check.

At decision 1702, the content control application receives the return value from the feedback application presented at step 1700. Based on this return value, the content control application decides whether the user has successfully completed the feedback application. If the determination is made that the user has unsuccessfully completed the application, the failure is reported at step 1706. The user is then given the opportunity to attempt to retake the feedback application at decision 1710. This may correspond to try again selection 1024 of FIG. 12. If the user is permitted to try the feedback application again, the user is returned to step 1700 for presentation of the feedback application. If the user selects not to try the feedback application again, access to media content at user equipment 102 (FIG. 1) may be completely or partially restricted at step 1714. After access has been restricted the media list does not continue to run. The user may remain in restricted mode for a pre-programmed amount of time or an unlock code may be received from a remote user. If the content control application receives a valid unlock code at decision 1718, the media list may be restarted at the failed feedback application at step 1700.

If, on the other hand, the determination is made that the user has successfully completed the feedback application at decision 1702, a reward (or the remainder of the media list) is presented to the user at step 1708 until the content control application determines that the media content is complete. If the content control application determines that the media content is complete at decision 1708, the user exits restricted mode at step 1712 and the presentation process stops at step 1716.

It will be noted that all of the features described above in connection with the media lists of the interactive content control application may be applied to various types of programming, including broadcast programming, recorded content, Internet content, interactive applications and games, VOD programs, PPV programs, series of programs, or any other media content capable of being displayed or presented to, recorded, or interacted with, a user at user equipment 102. Although the described embodiments are directed toward parental control methods and systems, the disclosed methods and systems work equally well in other fields, such as employee testing and training, remote monitoring, and any other application that could benefit from user feedback via an interactive media system.

The above described embodiments of the present invention are presented for purposes of illustration and not of limitation, and the present invention is limited only by the claims which follow.

What is claimed is:

1. A method for controlling presentation of media content on user equipment, the method comprising:
receiving a plurality of media assets, wherein at least one of the plurality of media assets is scheduled for transmission at a given time to a plurality of users;
selecting a subset of the plurality of media assets for insertion into a list of media assets, wherein the list of media assets includes at least one feedback application associated with completion criteria;
storing, at the user equipment, a pre-programmed time;
determining whether a media asset in the selected subset of the plurality of media assets is scheduled for a future transmission at least partially before the pre-programmed time;
automatically recording at least a part of the media asset in the selected subset of the plurality of media assets in response to determining that the media asset in the selected subset of the plurality of media assets is scheduled for a future transmission at least partially before the pre-programmed time;
determining, at the user equipment, whether a current-time matches the pre-programmed time;
in response to determining that the current-time matches the pre-programmed time, generating a display of a media asset from the list of media assets;
in response to determining that the media asset has concluded, generating a display of the at least one feedback application;
receiving user input in response to generating the display of the at least one feedback application; and
determining, at the user equipment, whether the received user input corresponds to the completion criteria associated with the at least one feedback application to determine whether the at least one feedback application was completed successfully.

2. The method of claim 1, wherein the pre-programmed time is a dynamic function of actions external to or internal to the user equipment.

3. The method of claim 1, further comprising reporting, to a remote user, the result of the determining from the received user input whether the at least one feedback application was completed successfully.

4. The method of claim 1 further comprising:
restricting access to substantially all media assets in response to determining that the at least one feedback application was not completed successfully.

5. The method of claim 1 further comprising:
causing the at least one feedback application to be displayed again in response to determining that the at least one feedback application was not completed successfully.

6. The method of claim 1 further comprising:
receiving a remote instruction from an authorized user after determining whether the at least one feedback application was completed successfully.

7. The method of claim 6 wherein the remote instruction is an instruction to cause the at least one feedback application to be displayed again.

8. The method of claim 6 wherein the remote instruction is an instruction to cause the media asset from the list of media assets to be displayed again.

9. The method of claim 1 further comprising:
awarding a user with a media privilege in response to determining that the at least one feedback application was completed successfully.

10. The method of claim 9 wherein the media privilege is selected from the group consisting of a VOD access quota, a PPV access quota, a storage device storage quota, a storage device access quota, and an unrestricted viewing quota.

11. The method of claim 9 wherein the media privilege is portable to a remote set of user equipment.

12. The method of claim 9, wherein the user equipment is the first user equipment and the media privilege is accessible to a user on a second user equipment.

13. The method of claim 1, wherein the list of media assets includes at least two feedback applications.

14. The method of claim 1, wherein generating the display of the at least one feedback application comprises generating a display of a prompt by the at least one feedback application requiring input from a user.

15. The method of claim 1, wherein the display of the at least one feedback application is generated at the pre-programmed time without receiving user input.

16. The method of claim 1, wherein the pre-programmed time is remotely specified and transmitted to the user equipment.

17. The method of claim 1, wherein the feedback application is accessible to a user independently of the list of media assets.

18. The method of claim 1, wherein the plurality of media assets is selected from the group consisting of recorded programs, broadcast programs, television series, VOD programs, PPV programs, Internet chatrooms, Internet newsgroups, Internet websites, interactive applications, and interactive games.

19. The method of claim 1, wherein the at least one feedback application is selected from the group consisting of Internet websites, interactive applications, interactive games, interactive quizzes, interactive educational courses, and interactive monitoring applications.

20. An apparatus for presenting media content on user equipment, the apparatus comprising:
memory for storing a list of media assets;
an input device for receiving user input; and
control circuitry for presenting the list of media assets, wherein the control circuitry is configured to:
receive a plurality of media assets, wherein at least one of the plurality of media assets is scheduled for transmission at a given time to a plurality of users;

select a subset of the plurality of media assets for insertion into a list of media assets, wherein the list of media assets includes at least one feedback application associated with completion criteria;

store, at the user equipment, a pre-programmed time;

determine whether a media asset in the selected subset of the plurality of media assets is scheduled for a future transmission at least partially before the pre-programmed time;

automatically record at least a part of the media asset in the selected subset of the plurality of media assets in response to determining that the media asset in the selected subset of the plurality of media assets is scheduled for a future transmission at least partially before the pre-programmed time;

determine, at the user equipment, whether a current-time matches the pre-programmed time;

generate a display of, in response to determining that the current-time matches the pre-programmed time, a media asset from the list of media assets;

generate a display of, in response to determining that the media asset has concluded, the at least one feedback application;

receive user input from the input device in response to generating the display of the at least one feedback application; and determine, at the user equipment, whether the received user input corresponds to the completion criteria associated with the at least one feedback application to determine whether the at least one feedback application was completed successfully.

21. The method of claim 20, wherein the pre-programmed time is a dynamic function of actions external to or internal to the user equipment.

22. The method of claim 20, wherein the control circuitry is further configured to report, to a remote user, the result of the determination from the received user input whether the at least one feedback application was completed successfully.

23. The apparatus of claim 20 wherein the control circuitry is further configured to:
restrict access to substantially all media assets in response to determining that the at least one feedback application was not completed successfully.

24. The apparatus of claim 20 wherein the control circuitry is further configured to:
cause the at least one feedback application to be displayed again in response to determining that the at least one feedback application was not completed successfully.

25. The apparatus of claim 20 wherein the control circuitry is further configured to:
receive a remote instruction from an authorized user after determining whether the at least one feedback application was completed successfully.

26. The apparatus of claim 25 wherein the remote instruction is an instruction to cause the feedback application to be displayed again.

27. The apparatus of claim 25 wherein the remote instruction is an instruction to cause the media asset from the list of media assets to be displayed again.

28. The apparatus of claim 20, wherein the control circuitry is further configured to:
award a user with a media privilege in response to determining that the feedback application was completed successfully.

29. The apparatus of claim 28 wherein the media privilege is selected from the group consisting of a VOD access quota, a PPV access quota, a storage device storage quota, a storage device access quota, and an unrestricted viewing quota.

30. The apparatus of claim 28 wherein the media privilege is portable to a remote set of user equipment.

31. The system of claim 28, wherein the user equipment is the first user equipment and the media privilege is accessible to a user on a second user equipment.

32. The apparatus of claim 20 wherein the plurality of media assets is selected from the group consisting of recorded programs, broadcast programs, television series, VOD programs, PPV programs, Internet chatrooms, Internet newsgroups, Internet websites, interactive applications, and interactive games.

33. The apparatus of claim 20 wherein the at least one feedback application is selected from the group consisting of Internet websites, interactive applications, interactive games, interactive quizzes, interactive educational courses, and interactive monitoring applications.

34. The system of claim 20, wherein the pre-programmed time is remotely specified and transmitted to the user equipment.

35. The system of claim 20, wherein the feedback application is accessible to a user independently of the list of media assets.

* * * * *